United States Patent
Asano

(10) Patent No.: US 7,503,077 B2
(45) Date of Patent: Mar. 10, 2009

(54) METHOD, STORAGE MEDIUM, AND APPARATUS TO PREVENT USE OR DISTRIBUTION OF UNAUTHORIZED COPIES OF STORAGE MEDIUM CONTENTS

(75) Inventor: Tomoyuki Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/550,001

(22) PCT Filed: Mar. 17, 2004

(86) PCT No.: PCT/JP2004/003579

§ 371 (c)(1),
(2), (4) Date: May 22, 2006

(87) PCT Pub. No.: WO2004/086233

PCT Pub. Date: Oct. 7, 2004

(65) Prior Publication Data

US 2006/0259979 A1    Nov. 16, 2006

(30) Foreign Application Priority Data

Mar. 26, 2003    (JP) .............................. 2003-085500

(51) Int. Cl.
G06F 7/04    (2006.01)
G11B 7/24    (2006.01)

(52) U.S. Cl. ........................ 726/32; 720/719

(58) Field of Classification Search .................. 726/30
See application file for complete search history.

(56) References Cited

U.S. PATENT DOCUMENTS

| 6,581,160 | B1 * | 6/2003 | Harada et al. ............... 713/169 |
| 6,738,904 | B2 * | 5/2004 | Linnartz et al. ............. 713/189 |
| 6,748,531 | B1 * | 6/2004 | Epstein ....................... 713/158 |
| 6,834,333 | B2 * | 12/2004 | Yoshino et al. ............. 711/163 |
| 6,850,914 | B1 * | 2/2005 | Harada et al. ................ 705/57 |
| 7,124,317 | B2 * | 10/2006 | Yoshino et al. ................ 714/6 |
| 7,137,012 | B1 * | 11/2006 | Kamibayashi et al. ...... 713/193 |
| 7,210,042 | B2 * | 4/2007 | Kambayashi ............... 713/193 |

(Continued)

FOREIGN PATENT DOCUMENTS

JP    2001-256113    9/2001

(Continued)

*Primary Examiner*—Christian LaForgia
(74) *Attorney, Agent, or Firm*—Sonnenschein Nath & Rosenthal LLP

(57) ABSTRACT

The present invention provides an information storage medium and a method and apparatus for processing information, which manage information storage media so as to prevent unauthorized copies of contents from being distributed or used. On an information storage medium on which an encrypted content is stored, an information storage medium ID which is an identifier uniquely assigned to an information storage medium, and an information storage medium ID revocation list, which is a list of information storage medium IDs determined as invalid, are further stored. In an information processing apparatus configured to read and play back the content stored on the information storage medium, playback of the content is allowed only when the information storage medium ID stored on the information storage medium is not identical to any of revoked information storage medium IDs described in the information storage medium ID revocation list. This prevents an unauthorized copy of a content from being distributed or used.

11 Claims, 17 Drawing Sheets

U.S. PATENT DOCUMENTS

| | | | |
|---|---|---|---|
| 7,243,228 B2* | 7/2007 | Shirai et al. | 713/160 |
| 2001/0021255 A1 | 9/2001 | Ishibashi | |
| 2002/0035492 A1* | 3/2002 | Nonaka | 705/5 |
| 2002/0071553 A1* | 6/2002 | Shirai et al. | 380/42 |
| 2002/0083282 A1* | 6/2002 | Yoshino et al. | 711/163 |
| 2002/0111925 A1 | 8/2002 | Kamabayashi | |
| 2002/0112197 A1* | 8/2002 | Yoshino et al. | 714/6 |
| 2002/0150250 A1* | 10/2002 | Kitaya et al. | 380/277 |
| 2002/0154779 A1* | 10/2002 | Asano et al. | 380/277 |
| 2002/0169971 A1* | 11/2002 | Asano et al. | 713/193 |
| 2002/0184259 A1* | 12/2002 | Akishita et al. | 707/501.1 |
| 2002/0199099 A1* | 12/2002 | Shirai et al. | 713/160 |
| 2003/0023847 A1* | 1/2003 | Ishibashi et al. | 713/169 |
| 2003/0076958 A1* | 4/2003 | Ishiguro et al. | 380/277 |
| 2003/0105956 A1* | 6/2003 | Ishiguro et al. | 713/158 |

FOREIGN PATENT DOCUMENTS

| | | |
|---|---|---|
| JP | 2002-133767 | 5/2002 |
| JP | 2002-237808 | 8/2002 |

\* cited by examiner (A) ENABLING KEY BLOCK
(EKB : Enabling Key Block) EXAMPLE 1

NODE KEY OF VERSION t IS TRANSMITTED TO DEVICES 0, 1, AND 2

| VERSION : t | |
|---|---|
| INDEX | ENCRYPTION KEY |
| 0 | Enc (K(t) 0, K(t) R) |
| 00 | Enc (K(t) 00, K(t) 0) |
| 000 | Enc (K000, K(t) 00) |
| 001 | Enc (K(t) 001, K(t) 00) |
| 0010 | Enc (K0010, K(t) 001) |

(B) ENABLING KEY BLOCK
(EKB : Enabling Key Block) EXAMPLE 2

TRANSMIT NODE KEY OF VERSION t TO DEVICES 0, 1, AND 2

| VERSION : t | |
|---|---|
| INDEX | ENCRYPTION KEY |
| 000 | Enc (K000, K(t) 00) |
| 001 | Enc (K(t) 001, K(t) 00) |
| 0010 | Enc (K0010, K(t) 001) |

FIG. 5

METHOD, STORAGE MEDIUM, AND APPARATUS TO PREVENT USE OR DISTRIBUTION OF UNAUTHORIZED COPIES OF STORAGE MEDIUM CONTENTS

TECHNICAL FIELD

The present invention relates to an information storage medium, an information processing apparatus, an information storage medium production apparatus, a method, and a computer program. More specifically, the present invention relates to an information storage medium, an information processing apparatus, an information storage medium production apparatus, a method, and a computer program, that prevent a CD-R disk or the like on which an unauthorized copy of a content is stored from being distributed or used, by storing a storage medium identifier on a content storage medium such as a CD, a DVD, or an MD and controlling use of contents, based on a revocation list that is a list of unauthorized storage media.

BACKGROUND ART

It is now very popular to distribute various kinds of software data, for example, audio data such music data, image data such as movie data, game programs, and application programs, via a network such as the Internet or via an information storage medium such as a CD (Compact Disc) or a DVD (Digital Versatile Disk). These distributed contents are played back and used on a PC (Personal Computer) of a user, a playback apparatus such as a CD player, a DVD player, or an MD player, or a game machine.

In general, the right of distribution of software contents such as music data or image data is held by producers or sellers of the software contents. Software contents are generally distributed under specific usage limitation to secure that only authorized users can use software contents and that unauthorized copies thereof cannot be made.

In recent years, it has become popular to digitally store information on a storage medium using a recording apparatus. Digital storage on a storage medium using a digital recording apparatus allows it to repeatedly store and play back image data or audio data without causing degradation. That is, it is possible to make copies of digital data many times without causing degradation in image quality or sound quality. However, this has brought about a problem that a large number of unauthorized disks, such as CD-R on which unauthorized copies of contents are stored, are illegally distributed.

Such illegal distributions of unauthorized storage media in markets cause losses of profits of owners of copyrights or distribution rights of contents such as music or movie contents.

DISCLOSURE OF INVENTION

In view of the above problems, it is an object of the present invention to provide an information storage medium, an information processing apparatus, an information storage medium production apparatus, a method, and a computer program, which disable playback or use of an unauthorized copy of content stored on a storage medium.

More specifically, it is an object of the present invention to provide an information storage medium, an information processing apparatus, an information storage medium production apparatus, a method, and a computer program, which disable playback or use of an unauthorized copy of content stored on a storage medium, by storing a storage medium identifier on a content storage medium such as a CD, a DVD, or an MD and controlling use of a content illegally copied on another information storage medium such as a CD-R, based on a revocation list that is a list of unauthorized storage media.

In a first aspect, the present invention provides an information storage medium storing thereon an encrypted content, encryption key information needed in a process of decoding the encrypted content, an information storage medium ID which is an identifier uniquely assigned to the information storage medium, and an information storage medium ID revocation list which is a list of information storage medium IDs determined as fraudulent.

In an embodiment of the information storage medium according to the present invention, the information storage medium ID revocation list includes a tampering check value for checking whether data described in the information storage medium ID revocation list is untamperred.

In an embodiment of the information storage medium according to the present invention, the encryption key information includes an enabling key block (EKB) as encryption key data from which a key used to decrypt the encrypted content is extractable.

In an embodiment of the information storage medium according to the present invention, the enabling key block (EKB) is encryption key information that can be decrypted based on a device node key (DNK) provided in the form of a hierarchical key-distribution tree structure to an information processing apparatus that is a device using the information storage medium.

In a second aspect, the present invention provides an information processing apparatus for playing back a content stored on an information storage medium, including a memory in which an information storage medium ID revocation list, which is a list of information storage medium IDs determined as fraudulent, is stored, wherein a check is made as to whether an information storage medium ID stored on the information storage medium is identical to one of revoked information storage medium IDs described in the storage medium information ID revocation list stored in the memory, and, if the information storage medium ID stored on the information storage medium is not identical to any one of the revoked information storage medium IDs described in the information storage medium ID revocation list, a content playback process is performed.

In an embodiment of the information processing apparatus according to the present invention, a tampering check process is performed to check whether no tampering is made on the information storage medium ID revocation list stored on the information storage medium, and, if the check indicates that no tampering is made, the version of the information storage medium ID revocation list stored on the information storage medium is compared with the version of that stored in the memory, and the information storage medium ID revocation list stored in the memory is updated by storing the information storage medium ID revocation list stored on the information storage medium into the memory when the version of the information storage medium ID revocation list is newer than the version of that stored in the memory.

In an embodiment of the information processing apparatus according to the present invention, the information processing apparatus has a device node key (DNK) as key information provided in the form of a hierarchical key-distribution tree structure, and a key used to decrypt an encrypted content stored on the information storage medium is extracted by decoding, based on the device node key (DNK), an enabling key block (EKB) stored as encryption key information on the information storage medium.

In a third aspect, the present invention provides an information storage medium production apparatus that produces an information storage medium such that information is stored on the information storage medium, the information including an encrypted content, encryption key information needed in a process of decoding the encrypted content, and an information storage medium ID revocation list which is a list of information storage medium IDs determined as fraudulent, and an information storage medium ID, which is an identifier uniquely assigned to each information storage medium, is stored on each produced information storage medium such that each information storage medium has a different information storage medium ID.

In an embodiment of the information storage medium production apparatus according to the present invention, the information storage medium ID revocation list includes a tampering check value for checking whether data described in the information storage medium ID revocation list is untampered.

In an embodiment of the information storage medium production apparatus according to the present invention, the encryption key information includes an enabling key block (EKB) as encryption key data to be applied in the decryption of the encrypted content.

In a fourth aspect, the present invention provides an information processing method of playing back a content stored on an information storage medium, including the steps of reading information storage medium ID stored on the information storage medium, checking whether the information storage medium ID stored on the information storage medium is identical to one of revoked information storage medium IDs described in a storage medium information ID revocation list, which is a list of invalid information storage medium IDs and which is stored in a memory of an information processing apparatus, and playing back the content if and only if the information storage medium ID stored on the information storage medium is not identical to any one of the revoked information storage medium IDs described in the information storage medium ID revocation list.

In an embodiment of the information processing method according to the present invention, the method further including the step of updating the list, the list updating step including the sub-steps of performing a tampering check process to check whether no tampering is made on the information storage medium ID revocation list stored on the information storage medium, if the check indicates that no tampering is made, comparing the version of the information storage medium ID revocation list stored on the information storage medium with the version of that stored in the memory, and updating the information storage medium ID revocation list stored in the memory by storing the information storage medium ID revocation list stored on the information storage medium into the memory when the version of the information storage medium ID revocation list is newer than the version of that stored in the memory.

In an embodiment of the information processing method according to the present invention, the method further including the step of acquiring a key used to decode an encrypted content stored on the information storage medium by decoding an enabling key block (EKB) stored as encryption key information on the information storage medium, the decoding of the enabling key block (EKB) being based on a device node key (DNK) provided as key information provided in the form of a hierarchical key-distribution tree structure.

In a fifth aspect, the present invention provides a method of producing an information storage medium, including the step of storing, on the information storage medium, an encrypted content, encryption key information needed in a process of decoding the encrypted content, and an information storage medium ID revocation list which is a list of information storage medium IDs determined as fraudulent, and storing an information storage medium ID, which is an identifier uniquely assigned to each information storage medium, on each produced information storage medium such that each information storage medium has a different information storage medium ID.

In a sixth aspect, the present invention provides a computer program that executes a process of playing back a content stored on an information storage medium, the process including the steps of reading information storage medium ID stored on the information storage medium;

checking whether the information storage medium ID stored on the information storage medium is identical to one of revoked information storage medium IDs described in a storage medium information ID revocation list, which is a list of invalid information storage medium IDs and which is stored in a memory of an information processing apparatus, and playing back the content if and only if the information storage medium ID stored on the information storage medium is not identical to any one of the revoked information storage medium IDs described in the information storage medium ID revocation list.

According to the present invention, as described above, an encrypted content, encryption key information needed to decode the encrypted content, an information storage medium ID which is an identifier uniquely assigned to an information storage medium, and an information storage medium ID revocation list, which is a list of information storage medium IDs determined as fraudulent, are stored on the information storage medium. In the information processing apparatus configured to read and play back the content stored on the information storage medium, playback of the content is allowed only when the information storage medium ID stored on the information storage medium is not identical to any of revoked information storage medium IDs described in the information storage medium ID revocation list. By describing information storage medium IDs stored on storage media detected as including unauthorized copies of contents in the information storage medium ID revocation list, it is possible to prevent a disk having an ID identical to any one of IDs described in the list from being played back, and thus it is possible to prevent an unauthorized copy of a content from being distributed and used.

In the information processing apparatus according to the present invention, a tampering check process is performed to check whether no tampering is made on the information storage medium ID revocation list stored on the information storage medium. If the check indicates that no tampering is made, the version of the information storage medium ID revocation list stored on the information storage medium is compared with the version of that stored in the memory. If the version of the information storage medium ID revocation list is newer than the version of that stored in the memory, the information storage medium ID revocation list stored in the memory is updated by storing the information storage medium ID revocation list stored on the information storage medium into the memory. This makes it possible to control the content playback operation in accordance with the list that is updated when a newer version is found.

The computer program according to the present invention may be provided, in a computer-readable form, to a general-purpose computer system that can execute various program codes, via a storage medium such as a CD, an FD, or an MO or via a communication medium such as a network. By providing the computer program in a computer-readable form to the computer system, it becomes possible to execute a process on the computer system according to the computer program.

These and other objects and features of the present invention will become more apparent from the following detailed description of embodiments with reference to the accompanying drawings. In the present description, the term "system" is used to describe a logical collection of a plurality of devices, and it is not necessarily required that the plurality of devices be disposed in a single case.

BRIEF DESCRIPTION OF THE DRAWINGS

FIG. 5 shows examples of various keys and enabling key blocks (EKB's) used in distribution of data.

BEST MODE FOR CARRYING OUT THE INVENTION

An information storage medium, an information processing apparatus, a method, and a computer program according to the present invention are described in detail below.

[1. Information Storage Medium]

Figure 1:
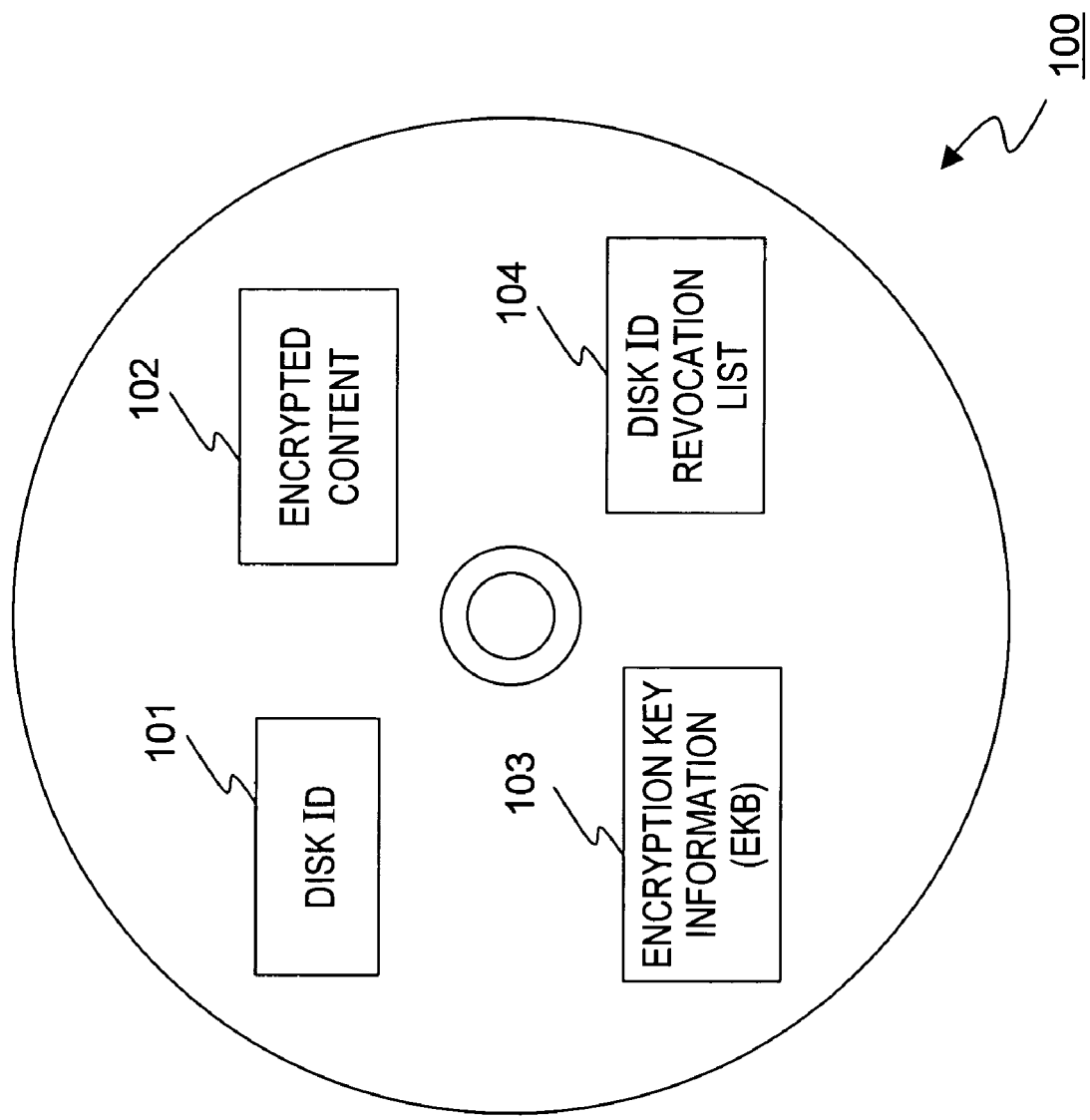
FIG. 1 is a diagram illustrating data stored on an information storage medium.

First, referring to FIG. 1 and other figures, an example of a format in which data is stored on an information storage medium according to the present invention is described. FIG. 1 shows data stored on an information storage media 100, such as a CD (Compact Disc), a DVD (Digital Versatile Disk), an MD (Mini Disk), or a flash memory. Although in the example shown in FIG. 1, the information storage media 100 is of a disk form, the present invention is not limited to the disk-type information storage medium, but the present invention may also be applied to other types of information storage media, such as a flash memory.

Information shown in FIG. 1 is stored on the information storage medium 100. A disk ID 101 is an identifier uniquely assigned to the disk, and the disk ID 101 is stored in a form that does not allow the disk ID 101 to be easily deleted or rewritten. The identifier of the information storage medium is referred to as a disk ID, because it is assumed in the embodiments described below that the information storage medium is of the disk type and is used to store contents. When another type of information storage medium such as a flash memory is used as the information storage medium for storing a content, an information storage medium ID corresponding to the disk ID is assigned and stored therein.

A content is stored in the form of an encrypted content 102. A content key necessary to decrypt the encrypted content 102 can be acquired by decrypting an enabling key block (EKB) 103, which is encryption key information stored on the information storage medium 100, based on a device node key (DNK) provided in the form of a hierarchical key structure to an information processing apparatus authorized to use the content.

The manner of providing the device node key (DNK) in the hierarchical key structure, and the process of acquiring the enabling key block (EKB) based on the device node key (DNK) will be described in detail later.

A disk ID revocation list (DIRL) 104 is also stored on the information storage medium 100. The disk ID revocation list (DIRL) 104 is a list of disks that have been determined to be fraudulent. For example, when a CD-R including an unauthorized copy of the content stored thereon is found, the disk ID copied together with the content on the unauthorized CD-R is extracted. The disk ID revocation list (DIRL) 104 is a collection of such revoked disk IDs. The production, management, and providing to disk manufacturers, of the disk ID revocation list (DIRL) 104 are performed by a particular high-reliability central authority (CA).

Figure 2:
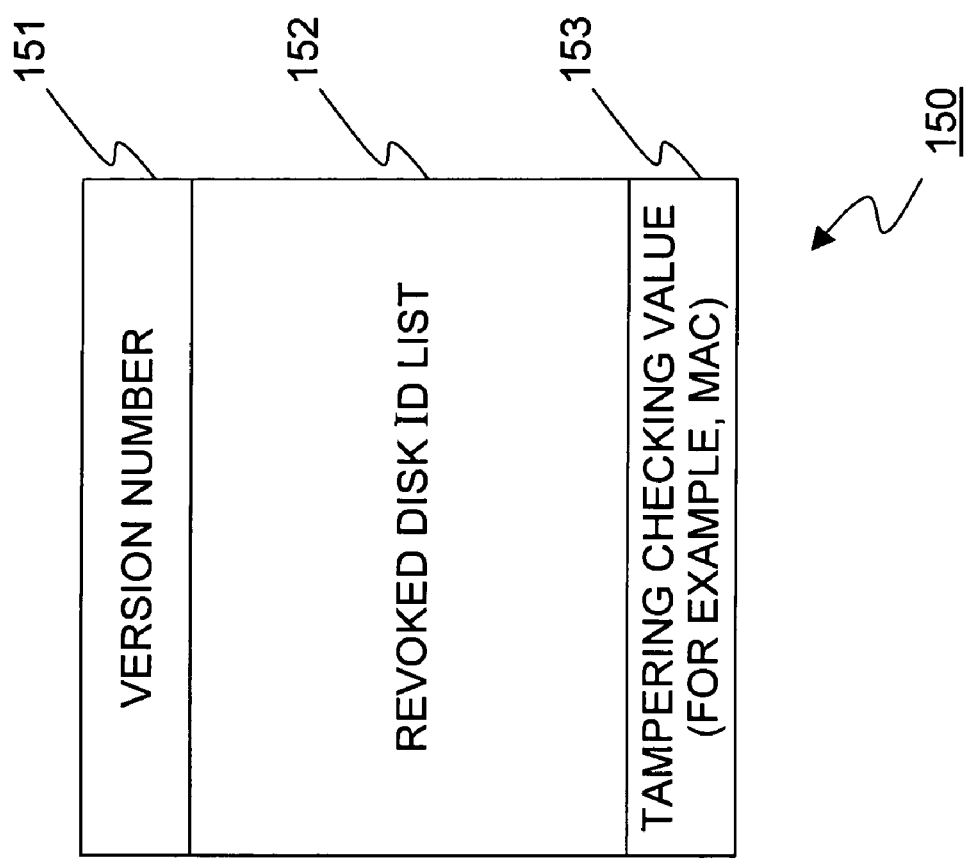
FIG. 2 is a diagram illustrating a data format of an information storage medium (disk) ID revocation list (DIRL) stored on an information storage medium.

A data format of the disk ID revocation list (DIRL) is described below with reference to FIG. 2. As shown in FIG. 2, the disk ID revocation list (DIRL) 150 includes a version number 151 which is monotonically increased depending on the date/time when the disk ID revocation list (DIRL) was produced, a revoked disk ID list 152 which is a list of revoked disk IDs, and an authentication code used as a tampering check value 153 defined for the version number 151 and the revoked disk ID list 152. The tampering check value 153 is data used to check whether no tampering has been performed on particular data to be checked, that is, the version number 151 and the revoked disk ID list 152 in this case. As for the tampering check value 153, a digital signature using a public key encryption technique or a message authorization code (MAC) using a common key encryption technique may be employed.

In the case in which a digital signature using the public key encryption technique is employed as the tampering check value 153, each a playback apparatus acquires a signature verification key (public key) from a reliable institution such as the above-mentioned central authority (CA), and the playback apparatus determines whether no tampering has been made on the version number 151 and the revoked disk ID list 152, by verifying the signature, which has been produced by the central authority (CA) using the signature production key (secret key), based on the acquired signature verification key (public key).

Figure 3:
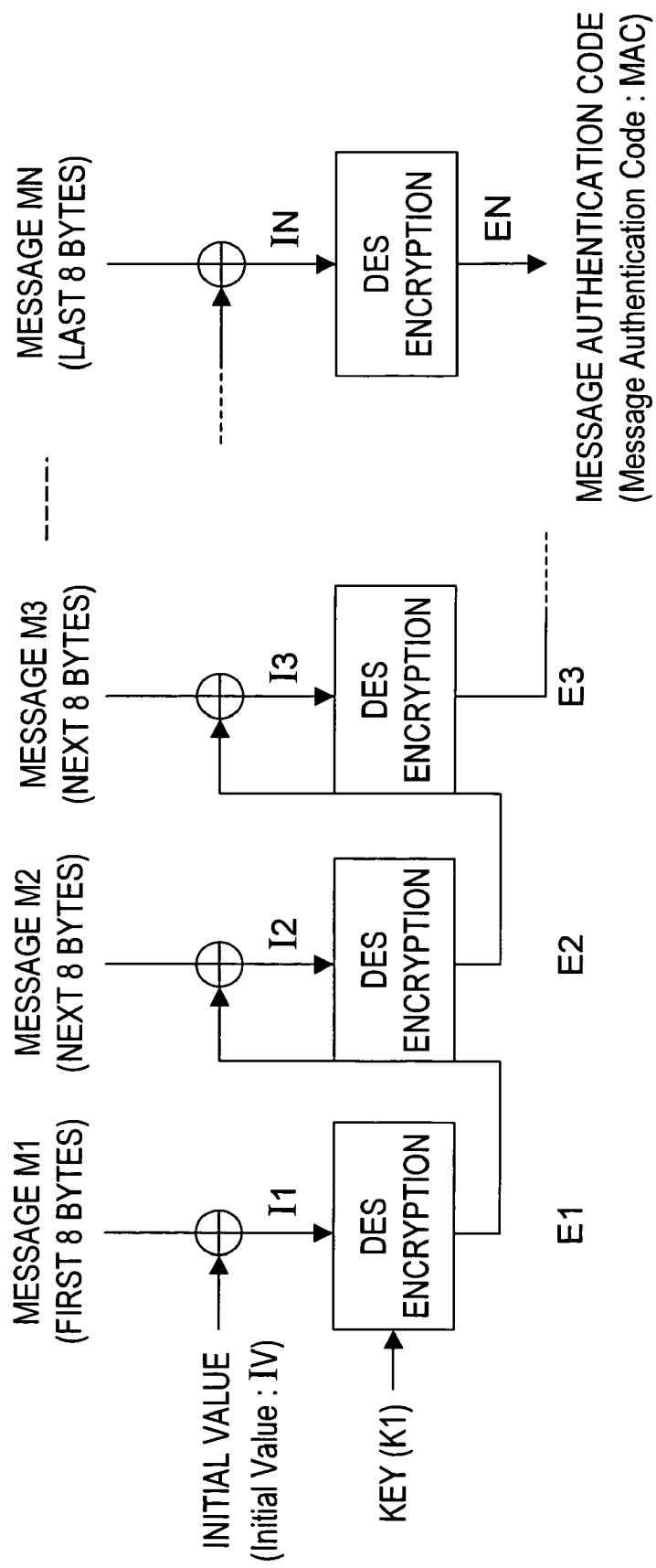
FIG. 3 is a diagram showing an example of an MAC value generation process.

When the message authentication code (MAC) is employed as the tampering check value 153, the MAC and produced and verified as described below with reference to FIG. 3. The message authentication code (MAC) is produced as data by which to check whether no tampering has been made on the data. The MAC value can be produced and verified in various manners. FIG. 3 shows an example of a manner in which the MAC value is produced using a DES encryption process.

As shown in FIG. 3, a message to be checked, that is, the version number 151 and the revoked disk ID list 152 shown in FIG. 2 in this specific case, is divided into units of 8 bytes (hereinafter, respective divided units of the message will be denoted by M1, M2, ..., MN). Thereafter, first, the exclusive OR of an initial value (IV) and M1 is calculated (and the result is denoted as I1). I1 is then applied to a DES encryption unit, which encrypts the applied I1 using a key (hereafter denoted as K1) (the result is output as E1). Subsequently, the exclusive OR of E1 and M2 is calculated, and the result is output as I2 to a DES encryption unit. The DES encryption unit encrypts I2 using the key K1 (and the result is output as E2). The above-described process is performed repeatedly until encryption is completed for all of M1, M2, ..., MN of the message. Thus, finally, EN is output as a message authentication code (MAC).

The MAC value depends on the original data (message), and thus it is possible to check whether tampering has been made on the data (message) by comparing the stored MAC of interest with the MAC re-calculated based on the data (message) to be checked. If the comparison indicates that there is no difference in terms of the MAC value, it is determined that no tampering has been made on the data (message) of interest.

As for the key K1 used in production of the MAC value, for example, it is possible to use a key (root key) obtained by decrypting an enabling key block (EKB) based on a device node key (DNK) given in the form of a hierarchical key structure. As for the initial value IV, it is possible to use a predetermined value.

[2. Hierarchical Key Structure for Use in Distribution of Keys]

A process of providing a key in the form of a hierarchical tree structure based on a broadcast encryption scheme, and a manner in which acquisition of the key by an information processing apparatus used as a playback is controlled apparatus are described below.

Figure 4:
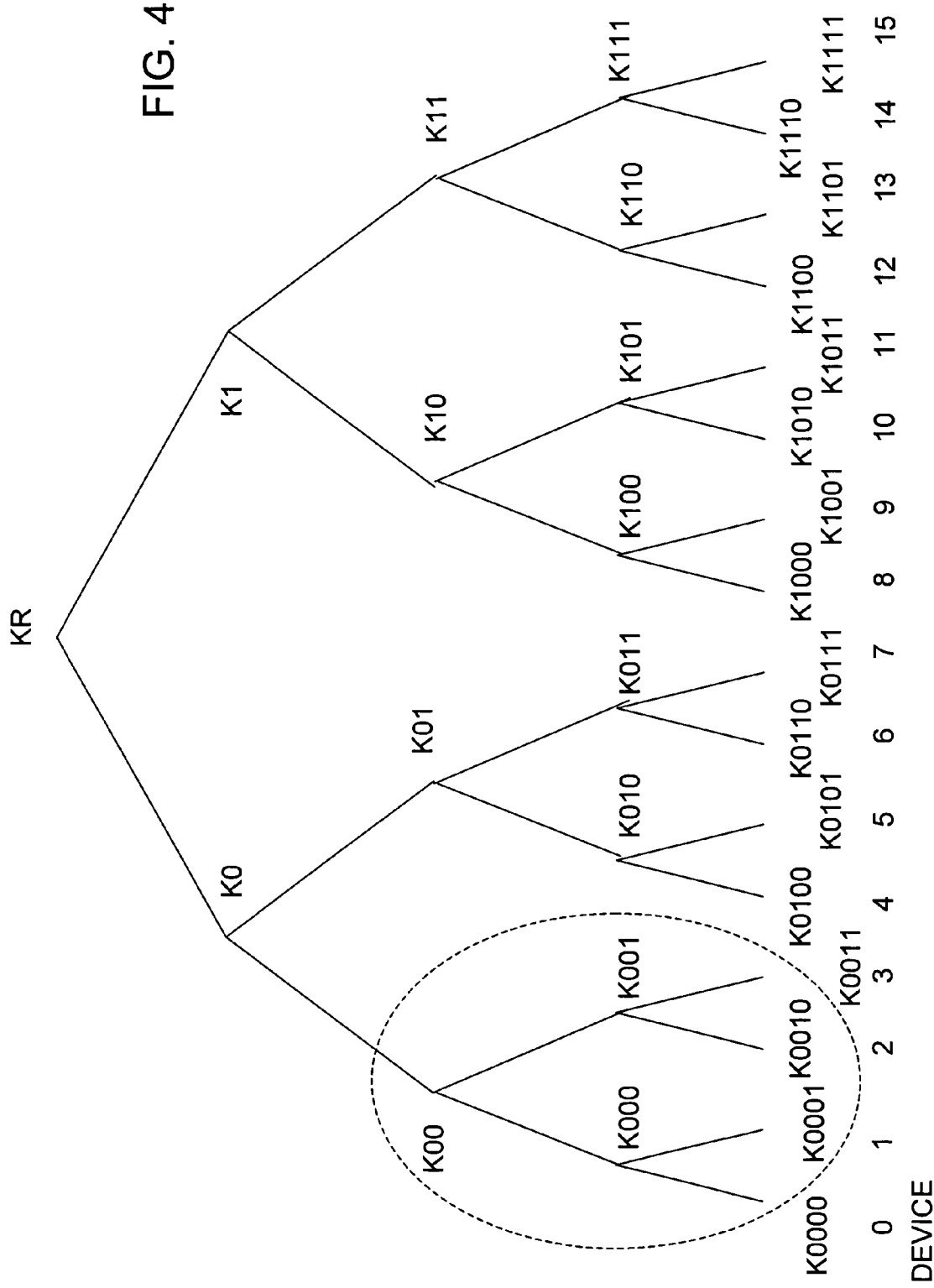
FIG. 4 is a tree structure diagram illustrating various keys, a data encryption process, and a distribution process.

In FIG. 4, numerals 0 to 15 at the bottom denote information processing apparatus serving as user devices by which to use contents. More specifically, leaves of a hierarchical tree structure correspond to respective devices.

When the devices 0 to 15 are produced or shipped, or after the devices 0 to 15 are shipped, a key set (device node key (DNK)) is stored in a memory of each device. The key set includes a leaf key assigned to a leaf corresponding to each device and also includes node keys assigned to respective nodes existing on a path from the leaf to a root of the hierarchical tree structure shown in FIG. 4. In FIG. 4, K0000 to K1111 at the bottom level denote leaf keys assigned to the respective devices 0 to 15, and KR (root key) to K111 at levels from the top to the second level as counted from the bottom denote node keys.

In the tree structure shown in FIG. 4, for example, the device 0 has a leaf key K0000 and node keys K000, K00, K0, and KR. Similarly, a device 5 has K0101, K010, K01, K0, and KR, and a device 15 has K1111, K111, K11 K1, and KR. Although in the specific example shown in FIG. 4, the tree includes only sixteen devices 0 to 15 and the tree has a symmetric four-level structure, the tree may include a greater number of devices and may have a different number of levels other than 4.

Each device in the tree structure shown in FIG. 4 may be of various types which may use various types of storage media such as a storage device fixedly disposed in a device or a removable storage medium such as a DVD, a CD, an MD, or a flash memory. Furthermore, various types of application services may be provided via this tree structure. That is, the hierarchal tree structure for use in distribution of contents or content keys, such as that shown in FIG. 4, is formed so as to adapt to such various types of devices and various types of applications.

In a system including such various types of devices and various types of applications, parts thereof are properly grouped. For example, in FIG. 4, a part enclosed by a dotted line is set as one group including devices 0, 1, 2, and 3, which use the same type of storage medium. For the devices included in this group enclosed by the dotted line, a common content in an encrypted form and/or a content key that can be used by all devices in the group may be transmitted to these devices from a provider via a network or may be provided via an information storage medium such as a CD. Each device in the group transmits content payment data in an encrypted form to the provider or a settlement institution. When an entity such as a content provider, a license serer, or a shop server transmits data to devices, it is possible to transmit data at the same time to all devices 0, 1, 2, and 3 in the group enclosed by the dotted line in FIG. 4. The tree shown in FIG. 4 may include a plurality of such groups.

All node keys and leaf keys may be managed in a unified fashion by one management system serving as a key management center, or node keys and leaf keys may be managed on a group-by-group basis by message data distribution means such as providers or settlement institutions that transmit and receive data to and from the respective groups. In a case where secrecy of a key is broken, node keys and leaf keys are renewed by the management system serving as the key management center, the providers, or the settlement institutions.

In the present tree structure, as can be seen from FIG. 4, all three devices 0, 1, 2, and 3 included in one group have the same device node keys (DNKs) K00, K0, and KR. Use of such common node keys makes it possible to provide, for example, a common content key only to the devices 0, 1, 2, and 3. For example, if the node key K00 are held by all devices 0, 1, 2, and 3. If a new key Knew is encrypted using the node key K00 and a value Enc(K00, Knew) obtained as a result of encryption is distributed to the devices 0, 1, 2, and 3 via a network or a storage medium, then only the devices 0, 1, 2, and 3 can acquire the new key Knew by decrypting the encrypted value Enc(K00, Kcon) using the node key K00 that are held in common by these devices. Herein, Enc(Ka, Kb) denotes data obtained by encrypting Kb using Ka.

At a some point of time t, if it turns out that keys K0011, K001, K00, K0, and KR held by the device 3 have been analyzed by a hacker and secrecy of the key has been broken, it is needed to isolate the device 3 from the system to protect data transmitted or received in the system (group including the devices 0, 1, 2, and 3). For this purpose, it is needed to change the node keys K001, K00, K0, and KR to new keys K(t)001, K(t)00, K(t)0, and K(t)R and transmit the new keys to the devices 0, 1, and 2. Herein, K(t)aaa denotes a renewed key of generation of t obtained by renewing a key Kaaa.

Distribution of renewed keys is described below. Renewal of keys is achieved by supplying a table representing block data called an enabling key block (EKB) such as that shown in FIG. 5(A) to the devices 0, 1, and 2 via a network or a storage medium. The enabling key block (EKB) includes encrypted keys used to provide renewed keys to the devices corresponding to leaves in the tree structure shown in FIG. 4. The enabling key block (EKB) is also called a key renewal block (KRB).

The enabling key block (EKB) shown in FIG. 5(A) includes block data that can be used for renewal of keys only by devices that need renewal of node keys. In the specific example shown in FIG. 5, the block data is produced for the purpose of distributing renewed node keys of generation of t to the devices 0, 1, and 2 in the tree structure shown in FIG. 4. As can be seen from FIG. 4, the devices 0 and 1 need K(t)00, K(t)0, and K(t)R as renewed node keys, and the device 2 needs K(t)001, K(t)00, K(t)0, and K(t)R as renewed node keys.

As can be seen from FIG. 5(A), the EKB includes a plurality of encrypted keys. An encrypted key Enc(K0010, K(t)001) described at the bottom is produced by encrypting renewed node key K(t)001 by the leaf key K0010 held by the device 2, and thus the device 2 can acquire the renewed node key K(t)001 by decrypting Enc(K0010, K(t)001) using the leaf key of the device 2. Using this renewed node key K(t)001 obtained via decryption, an encrypted key Enc(K(t)001, K(t)00) in the second level as counted from the bottom in FIG. 5(A) can be decrypted into the renewed node key K(t)00. Similarly, an encrypted key Enc(K((t)00, K(t)0) in the second level as counted from the top in FIG. 5(A) can be decrypted into the renewed node key K(t)0, and an encrypted key Enc (K(t)0, K(t)R) at the top in FIG. 5(A) can be decrypted into K(t)R. On the other hand, for the devices K0000 and K0001, the node key K000 is not needed to renew, and thus only renewed keys K(t)00, K(t)0, and K(t)R are needed for the devices K0000 and K0001. The devices K0000 and K0001 acquire K(t)00 by decrypting an encrypted key Enc(K000, K(t)00) at the third level as counted from the top in FIG. 5(A), and acquire the renewed node key K(t)0 by decrypting the encrypted key Enc(K(t)00, K(t)0) at the second level as counted from the top in FIG. 5(A). Furthermore, K(t)R is acquired by decrypting the encrypted key Enc(K(t)0, K(t)R) at the top in FIG. 5(A). In this way, the devices 0, 1, and 2 can acquire the renewed key K(t)R. In FIG. 5(A), indices indicate the absolute addresses of the node keys and leaf keys used as decryption keys.

In a case where the node keys K(t)0 and K(t)R in high levels of the tree structure shown in FIG. 4 are not need to be renewed, but only the node key K00 is needed to renew, the enabling key block (EKB) may be formed such as shown in FIG. 5(B) whereby the renewed node key K(t)00 can be distributed to the devices 0, 1, and 2.

The EKB shown in FIG. 5(B) may be used to distribute a new content key to be used in common by a particular group. For example, let us assume that the devices 0, 1, 2, and 3 in the group enclosed by the dotted line in FIG. 4 use a particular type of storage media and that a new common content key K(t)con is needed. In this case, the renewed content key K(t)con for use in common is encrypted using K(t)00 obtained by renewing the node key K00 used in common by the devices 0, 1, 2, and 3, and resultant encrypted data Enc(K (t)00, K(t)con) is distributed together with the EKB shown in FIG. 5(B). This method of distribution allows data to be distributed such that the distributed data cannot be decrypted by the other devices such as a device 4.

That is, the devices 0, 1, and 2 can acquire the content key K(t)con that is valid at the point of time t by decrypting the encrypted data described above using K(t)00 that can be obtained by processing the EKB.

Figure 6:
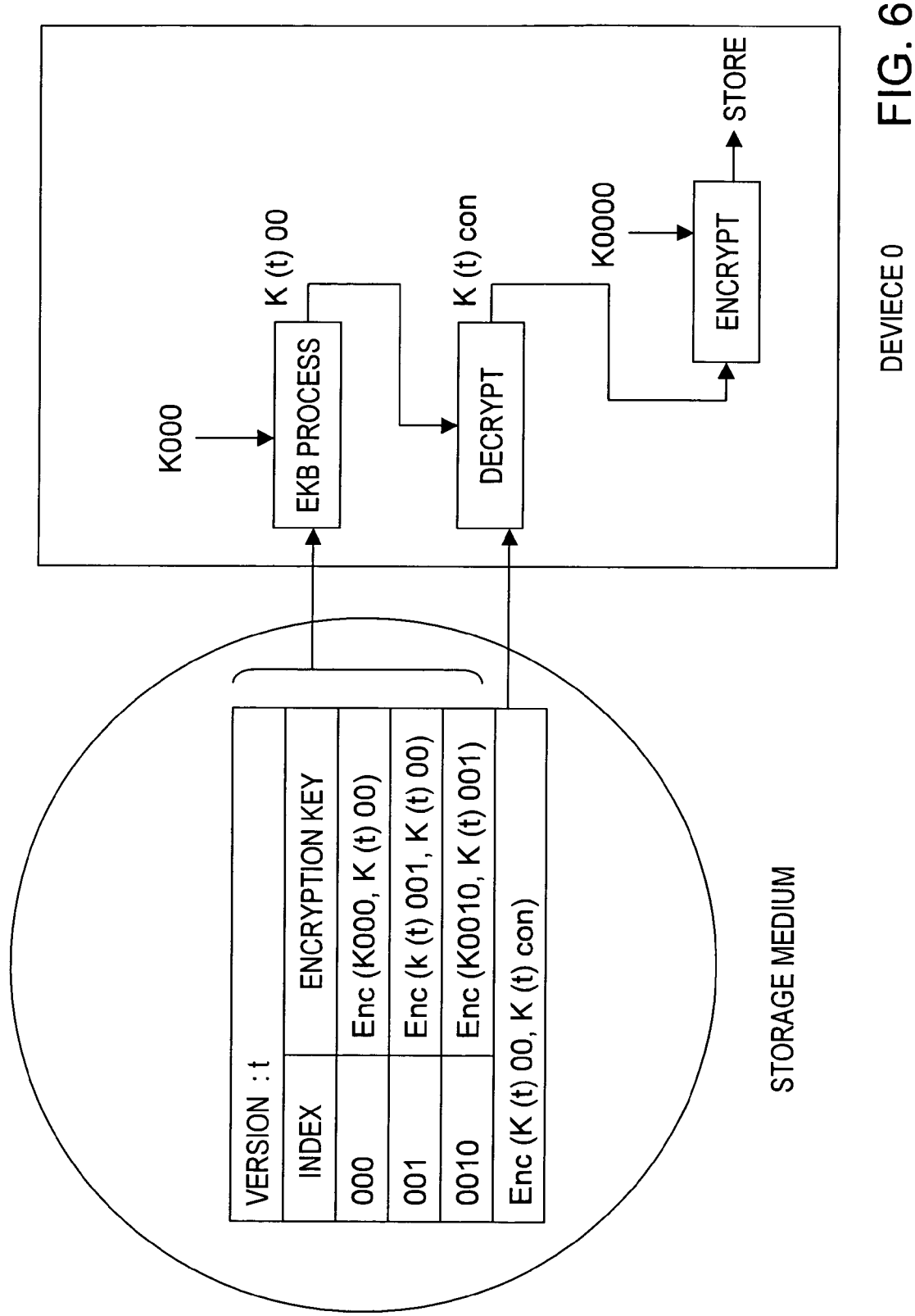
FIG. 6 is a diagram showing an example of a manner in which a content key is distributed using an enabling key block (EKB) and an example of a manner in which the enabling key block (EKB) is decoded.

FIG. 6 illustrates a specific example of a process of extracting a content key K(t)con, as of the time t, used to encrypt/decrypt a content, from an EKB. Herein, it is assumed that the EKB includes Enc(K(t)00, K(t)con) obtained by encrypting the content key K(t)con using K(t)00 and also includes data shown in FIG. 5(B). In the following discussion, by way of example, the process performed by the device 0 is described.

As shown in FIG. 6, the device 0 produces the node key K(t)00 by processing the EKB of the generation of t stored on the storage medium, by using the node key K000, which is already held by the device 0, in a similar manner as described above. Thereafter, the renewed content key K(t)con is acquired by decrypting the encrypted data Enc(K(t)00, K(t) con) using the renewed node key K(t)00. Furthermore, the renewed content key K(t)con may be encrypted using the leaf key K0000 held only by the device 0 so that the content key K(t)con can be used at any time thereafter.

In some cases, renewing of node keys in the form of tree structure is not necessary, but it is needed to provide only a content key K(t)con valid as of the time of t to particular devices. This can be accomplished as follows.

To send the content key K(t)con only to devices 0, 1, and 2 as in the example shown in FIG. 6, the EKB is set as follows.

| Version: t | |
|---|---|
| Index | Encrypted Key |
| 000 | Enc(K000, K(t)con) |
| 0010 | Enc(K0010, K(t)con) |

The devices 0 and 1 can acquire the content key by decrypting one of encrypted code included in the EKB based on K000, and the device 2 can acquire the content key by decrypting one of encrypted code included in the EKB based on K0010. The method described above makes it possible to provide a content key to particular devices in a more sufficient manner (that is, the enabling key block (EKB) includes a less number of encrypted codes and thus has a smaller data size, and the enabling key block (EKB) can be encrypted by the center authority (CA) and can be decrypted by devices by a less number of processing steps), although renewing of node keys is impossible.

Figure 7:
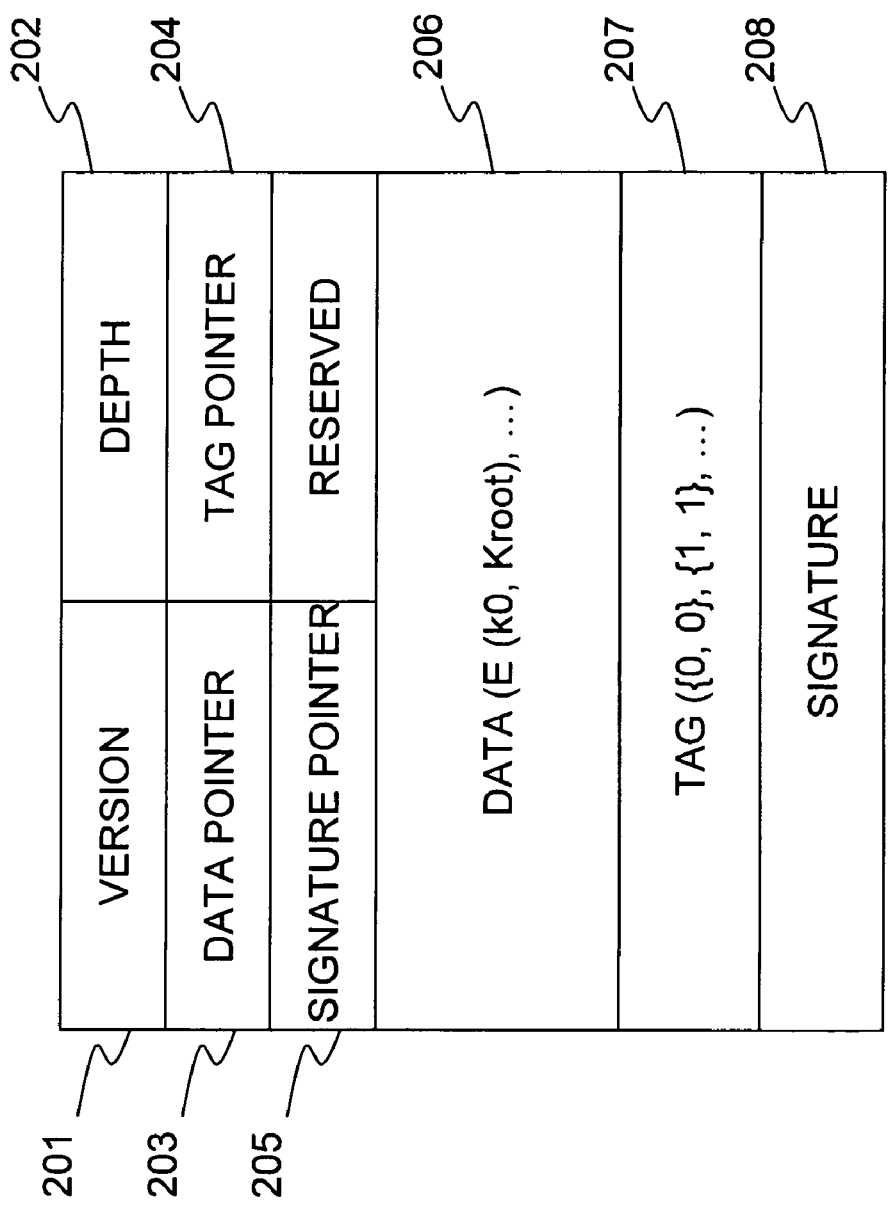
FIG. 7 is a diagram showing an example of a format of an enabling key block (EKB).

FIG. 7 shows an example of a format of an enabling key block (EKB). A version 201 is an identifier indicating the version of the enabling key block (EKB). The version serves not only to identify the newest EKB but also to indicate the correspondence with contents. The depth indicates the number of layers of a hierarchical tree of devices to which the enabling key block (EKB) is distributed. A data pointer 203 points to a location of data field in the enabling key block (EKB). A tag pointer 204 points to a location of a tag field, and a signature pointer 205 points to a location of a signature.

The data field 206 is used to store encrypted data such as a renewed node key. For example, data of encrypted keys associated with a renewed node key, such as that shown in FIG. 5, is stored in the data field.

Figure 8:
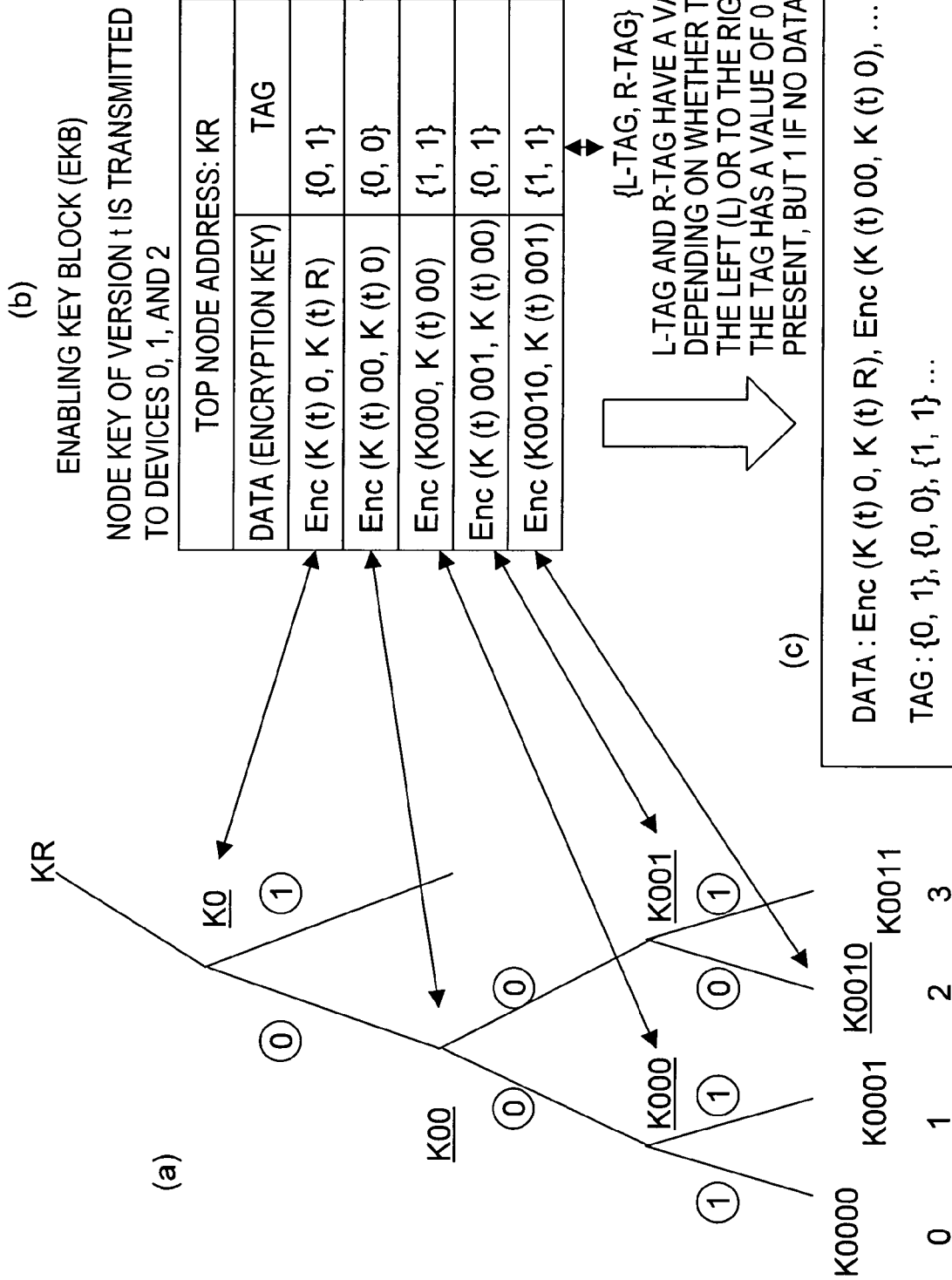
FIG. 8 is a diagram illustrating a tag structure of an enabling key block (EKB).

The tag field 207 is used to store tags indicating the locations of the encrypted node keys and leaf key stored in the data field. The rule of determining the tags is described below with reference to FIG. 8. In a specific example shown in FIG. 8, the enabling key block (EKB) described above with reference to FIG. 5(A) is transmitted as the data. A table (b) in FIG. 8 shows the data that is transmitted in this specific example. Herein, the address of a top node in encrypted keys is referred to as a top node address. In this specific case, because a renewed root key K(t)R is included in the encrypted keys, the top node address is given as KR. Data Enc(K(t)0, K(t)R) at the top corresponds to a location of a hierarchical tree shown in (a) of FIG. 8. The location in the hierarchical tree for next data Enc(K(t)00, K(t)0) is lower left to the location of the previous data. When there is data, a tag is set to 0, while the tag is set to 1 when there is no data. The tag is represented in the form of {L-tag, R-tag}, wherein L-tag denotes a left tag and R-tag denotes a right tag. In the case of the data Enc(K(t)0, K(t)R) in the top row, there is data to the left thereof, and thus the L-tag is set to 0, while the R-tag is set to 1 because there is no data to the right thereof. Tags are set for all data in a similar manner. As a result, a sequence of data and a sequence of tags are produced as shown in FIG. 8(c).

The tags indicate the locations of data Enc(Kxxx, Kyyy) in the tree structure. Key data Enc(Kxxx, Kyyy) stored in a data field is a simple sequence of encrypted keys, and thus the tags are used to indicate the locations, in the tree, of encrypted keys stored in the data field. Instead of using the tags, the locations in the tree may be represented by adding node indexes to the corresponding encrypted data, as described earlier with reference to FIG. 5. More specifically, the node indexes may be added as follows.

0: Enc(K(t)0, K(t)root)
00: Enc(K(t)00, K(t)0)
000: Enc(K((t)000, K(T)00)

However, use of the indexes results in redundancy in the data, and thus a greater data size is needed to describe the data, which is undesirable in transmission via a network. In contrast, if tags are used as index data indicating the locations of keys, the locations of keys can be indicated by data with a smaller data size.

Referring back to FIG. 7, the format of EKB is described further. A signature 208 is a digital signature written by a management system having a key management center, a content server, a license server, or a shop server, which issues an enabling key block (EKB). When a device receives an EKB, the device verifies the signature to determine whether the received enabling key block (EKB) is a correct one issued by an authorized enabling key block (EKB) issuer.

Now, an explanation is given as to a manner in which devices are categorized using a hierarchical tree structure defining node keys thereby making it possible to efficiently renew keys, provide encrypted keys, and transmit data.

Figure 9:
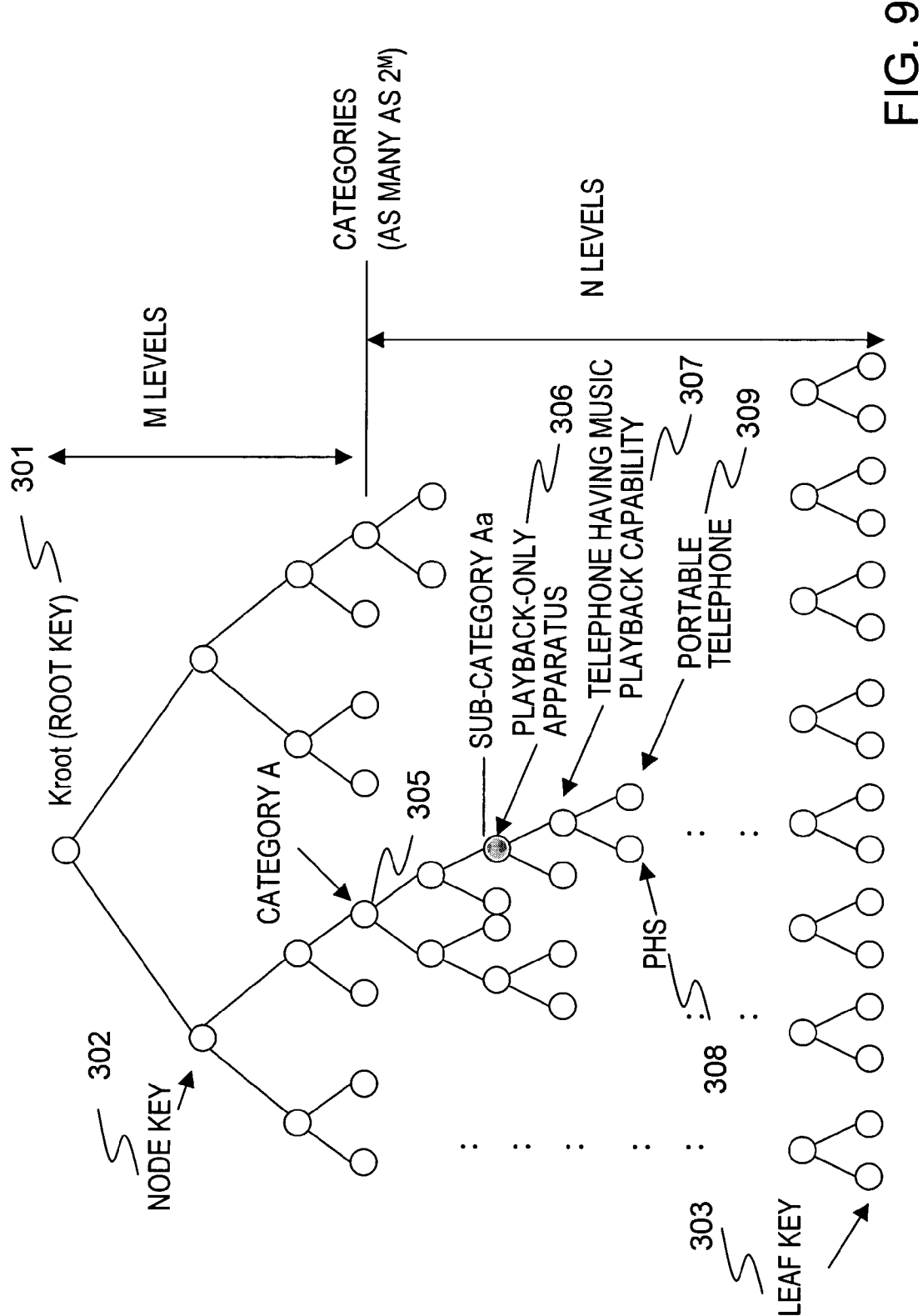
FIG. 9 is a diagram showing a manner in which categories are defined using a tree structure.

FIG. 9 shows an example of categorization using a hierarchical tree structure. In this example shown in FIG. 9, a root key Kroot 301 is assigned to the top of the hierarchical tree structure, node keys 302 are assigned in middle levels, and leaf keys 303 are assigned at the bottom. Each device has a set of keys including a leaf key of the device itself, the root key, and node keys existing in the path from the leaf key to the root key.

By way of example, it is assumed herein that nodes in an M-th level as counted from the top are defined as category nodes 304. That is, nodes in the M-th level are employed to define specific categories of devices. One node at the M-th level is employed as a top node, and nodes and leaves that exist at the (M+1)th level and lower levels in paths originating from that top node are defined to be included in the category assigned to the top node.

For example, one node 305 in the M-th level in FIG. 9 is employed to define a category A, and nodes and leaves existing in paths originating from this node are defined to correspond to various devices belonging to the category of A. That is, a set of nodes including the node 305 and associated lower-level nodes and leaves is defined to belong to the category A.

Furthermore, a sub-category node 306 may be set at a level a proper number of levels below the M-th level. For example, as shown in FIG. 9, a node of a sub-category Aa belonging to the category A may be set at a level two levels below the category node 305 assigned to the category A, and the node of the sub-category Aa may be assigned as a node of "playback-only apparatus". Similarly, a node 307 below the node 306 of the sub-category Aa assigned for the playback-only apparatus may be employed for a sub-category of "telephones having a music playback capability" belonging to the category of playback-only apparatus. At a further lower level, a sub-category node 308 of "PHS" and a sub-category node 309 of "portable telephone" may be defined such that both sub-categories belong to the category of telephone having music playback capability.

Categories and subcategories can be defined according to not only the types of devices but also manufacturers, content providers, or settlement institutions, and those nodes may be respectively managed by them. That is, categories and sub-categories may be defined so as to have arbitrary scopes in accordance with, for example, processing, management organizations, or services provided. For example, if one category node is set as a top node for dedicated use for a game machine XYZ provided by a game machine manufacturer, it becomes possible to sell game machines XYZ in which node keys and leaf keys below the top node are stored. After selling the game machines XYZ, encrypted contents or keys may be supplied or keys may be renewed by supplying an enabling key block (EKB) including the top node key and node keys and leaf keys below the top node so that only devices below the top node can use the supplied data.

When a node managed by a content provider is employed as a category node, it is possible to assign nodes below that category node to devices that use information storage media such as a CD, an MD, or a DVD on which contents provided by the content provider are stored or that use contents provided via a network by the content provider, so that each device assigned a particular node can use node keys and a leaf key at levels below the assigned node.

As described above, when one node is given as a top node, lower-level nodes arising from the top node are defined as belonging to a category or a sub-category assigned to that top node, thereby making it possible for a manufacturer or a content provider that manages one top node of one category or sub-category to produce an enabling key block (EKB) including that top node without having to taking into account the other categories or sub-categories and distribute the resultant enabling key block (EKB) to devices corresponding to the top node or the lower-level nodes arising from the top nodes, and thus making it possible to renew a key without exerting any influence on devices belonging to the other categories that do not belong to that top node.

Figure 10:
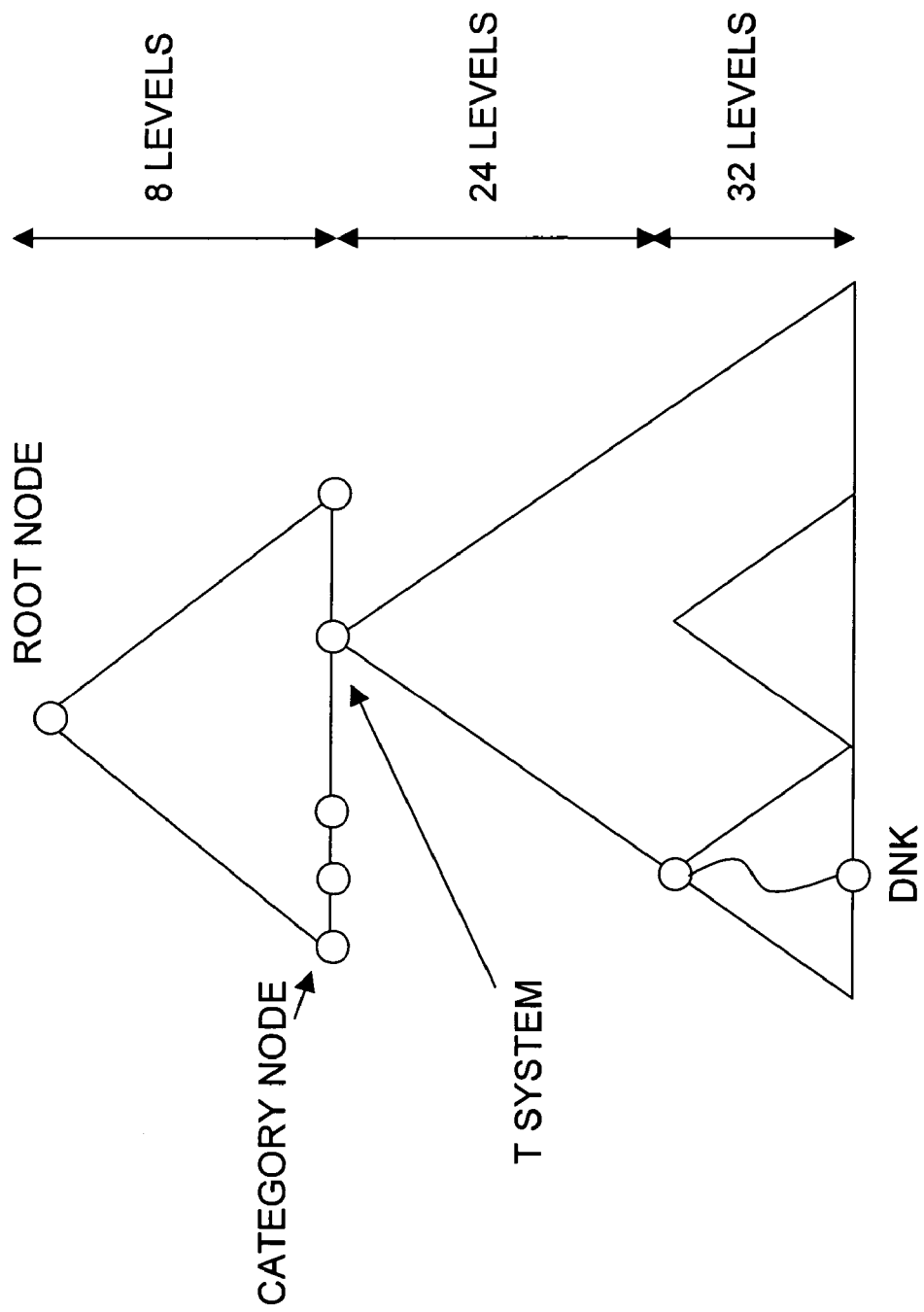
FIG. 10 is a diagram showing a manner in which categories are defined using a tree structure.

Keys are managed in the form of a tree structure, for example, as shown in FIG. 10. In this example shown in FIG. 10, nodes at 8+24+32 levels are defined in a tree structure and categories are assigned to the root node and respective nodes at 8 levels below the root node. Herein, the categories may be a category of devices that use a semiconductor memory such as a flash memory, or a category of devices that receive digital broadcast. One of these category nodes is assigned to a system that manages licenses (hereinafter referred to as a T system).

Keys corresponding to nodes at 24 levels located below the node of the T system are used by management entities or service providers such as shop servers or license servers or used for services provided by service providers. In this specific case, it is possible to define $2^{24}$ (about 16 mega) service providers or services at these nodes. At further lower 32 levels, it is possible to define $2^{32}$ (about 4 giga) users (or user devices). Keys corresponding to respective nodes located on paths from each node at the bottom of the lowest 32 levels to the node of the T system are DNKs (Device Node Keys), and leaf IDs are defined at the bottom level.

For example, a content key by which a content has been encrypted is encrypted using a renewed root key KR', a renewed node key at a higher level is encrypted using a renewed node key at an immediately lower level, and these encrypted content key and encrypted renewed node keys are disposed in an EKB. A renewed node key at a level immediately above the bottom of the EKB is encrypted using a node key or a leaf key at the bottom of the EKB and disposed in the EKB.

In a user device, using one of DNKs described in service data, the renewed node key at the level immediately above the DNK, described in the EKB distributed together with content data, is decrypted. Using the key obtained as a result of decryption, the renewed node key at the further higher level described in the EKB is decrypted. By performing decryption successively in a similar manner, the user device can acquire the renewed root key KR'.

As described above, in the categorization using the tree structure, a category can be defined at a top node, and nodes at levels below that top node can be used as nodes associated with that category or sub-categories thereof. Each manufacturer or service provider that manages one of top nodes at a category level or a sub-category level produces an enabling key block (EKB) whose top node is the node managed by the manufacturer or the service provider, and distributes the EKB to devices corresponding to nodes at levels below the top node.

[3. Process Performed by Information Processing Apparatus]

Now, a content using process performed by an information processing apparatus such as a playback apparatus to play back a content stored on an information storage medium is described below.

Figure 11:
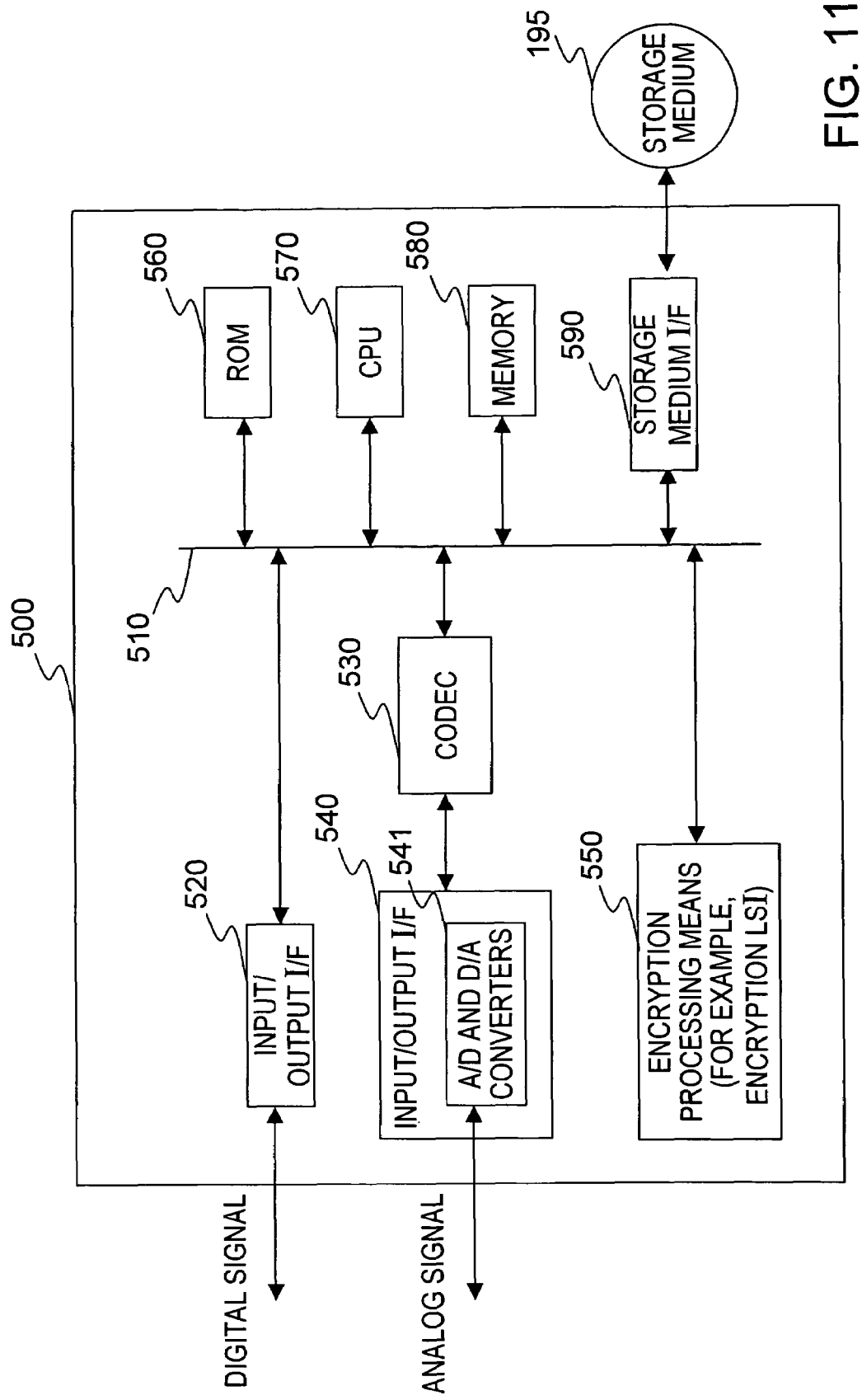
FIG. 11 is a block diagram showing a structure of an information processing apparatus.

FIG. 11 is a block diagram showing a structure of an information processing apparatus 500 according to an embodiment of the present invention. The information processing apparatus 500 includes an input/output I/F (Interface) 520, a codec 530 that encodes and decodes data according to, for example, the MPEG (Moving Picture Experts Group) standard, an input/output I/F (Interface) 540 including A/D and D/A converters 541, encryption processing means 550, a ROM (Read Only Memory) 560, a CPU (Central Processing Unit) 570, a memory 580, and a storage medium interface (I/F) 590 for interfacing with a storage medium 595. These parts are connected to each other via a bus 510.

The input/output I/F 520 receives a digital signal supplied from the outside via a network or the like and outputs the received digital signal over the bus 510. The input/output I/F 520 also receives a digital signal supplied via the bus 510 and outputs the received digital signal to the outside. The codec 530 decodes MPEG-coded data supplied via bus 510 and outputs the resultant data to the input/output I/F 540. The codec 530 also encodes a digital signal supplied from the input/output I/F 540 and outputs the resultant encoded digital signal over the bus 510. The input/output I/F 540 includes the A/D and D/A converters 541. When the input/output I/F 540 receives an analog signal supplied from the outside, the input/output I/F 540 converts the received analog signal into a digital signal using the A/D and D/A converters 541 and outputs the resultant digital signal to the codec 530. On the other hand, when the input/output I/F 540 receives a digital signal from the codec 530, the input/output I/F 540 converts the received digital signal into an analog signal using the A/D and D/A converters 541 and outputs the resultant analog signal to the outside.

The encryption processing means 550 is implemented, for example, in the form of a one-chip LSI (Large Scale Integrated Circuit) and serves to encrypt or decrypt a digital signal such as a digital content data supplied via the bus 510 and outputs the resultant signal over the bus 510. The encryption processing means 550 does not necessarily need to be implemented on a one-chip LSI but may be implemented using software or a combination of software and hardware.

The ROM 560 stores a leaf key that is a device key uniquely assigned to the information processing apparatus or to a group of information processing apparatuses and also stores node keys that are common device keys assigned to a plurality of information processing apparatuses or to a plurality of groups. The CPU 570 controls the codec 530 and the encryption processing means 550 by executing a program stored in the memory 580.

The memory 580 reads a disk ID revocation list (DIRL) from a disk and stores it. The disk ID revocation list (DIRL) is securely stored in the memory. That is, it is desirable that the disk ID revocation list (DIRL) be encrypted based on an ID assigned to the information processing apparatus 500 and the resultant encrypted disk ID revocation list (DIRL) be stored in the memory so that the disk ID revocation list (DIRL) cannot be easily tampered. That is, the disk ID revocation list (DIRL) is stored in a form that prevents it from being deleted, tampered, or replaced with an old version of the disk ID revocation list (DIRL).

The memory 580 includes a storage area used to store a program executed by the CPU 570 and a storage area used to store data necessary in the process performed by the CPU 570. The storage medium interface 590 reads (plays back) digital data from the storage medium 595 by driving the storage medium 595 capable of writing and reading digital data, and outputs the read digital data over the but 510. The storage medium interface 590 also receives digital data via the bus 510 and supplies the received digital data to the storage medium 595 to store it thereon.

The storage medium 595 is a medium capable of storing digital data. Specific examples of the storage medium 595 include an optical disk such as a DVD, a CD or an MD, a magentooptical disk, a magnetic disk, a magnetic tape, and a semiconductor memory such as a RAM. Herein, it is assumed that the storage medium 595 is removably connected to the storage medium interface 590, although the storage medium 595 may be fixedly disposed inside the information processing apparatus 500.

Figure 12:
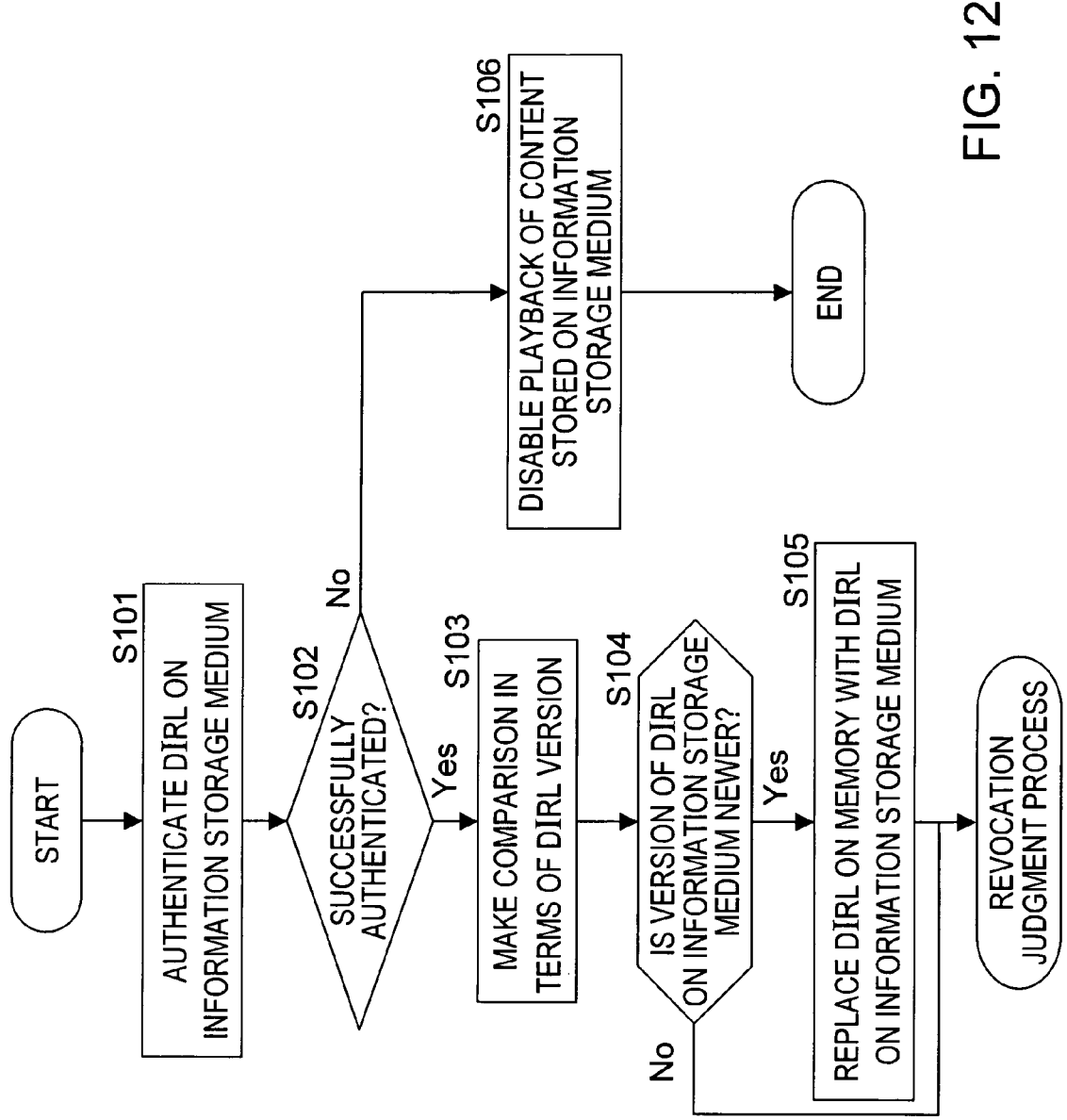
FIG. 12 is a flow chart showing a process performed by an information processing apparatus.
Figure 13:
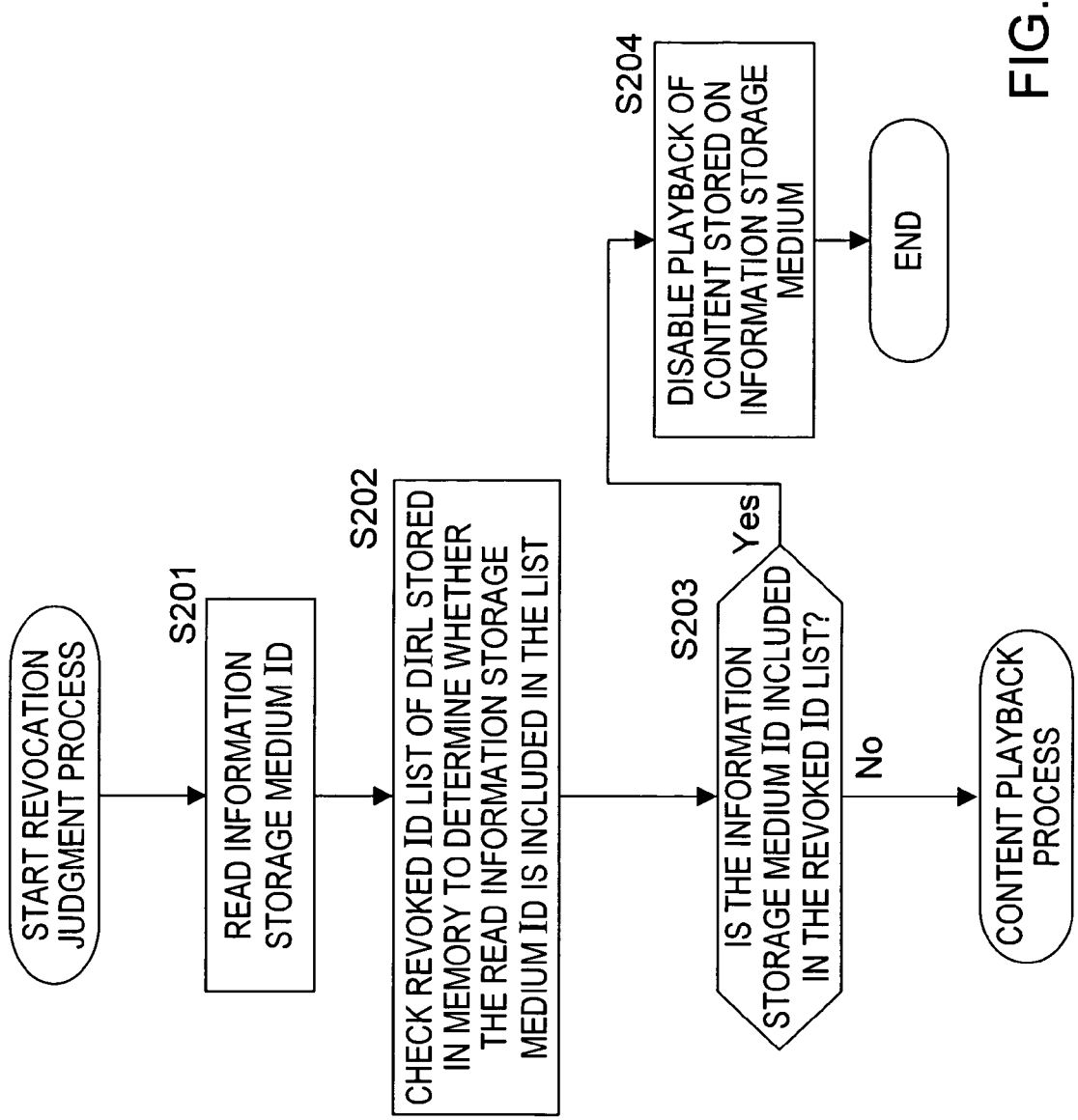
FIG. 13 is a flow chart showing a revocation checking process performed by an information processing apparatus.
Figure 14:
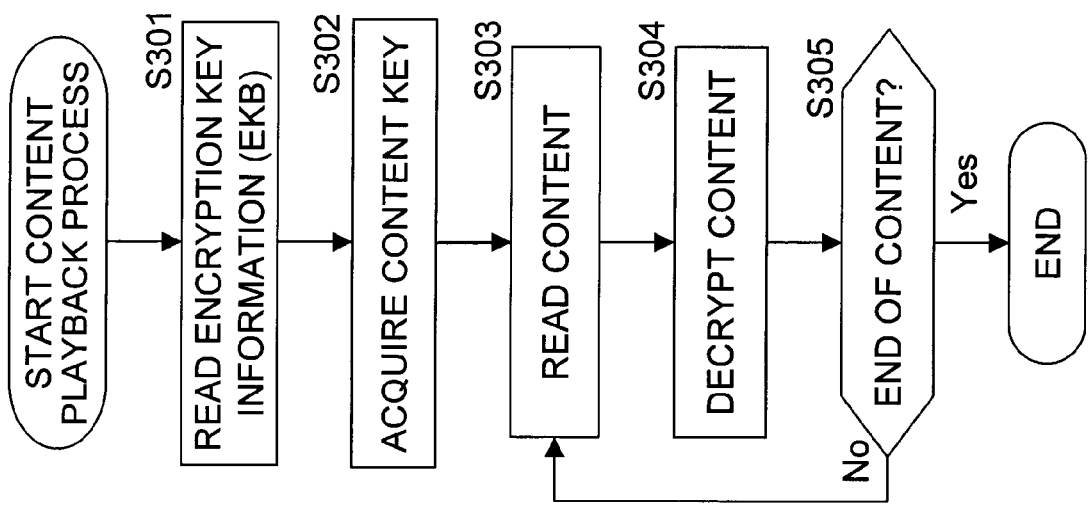
FIG. 14 is a flow chart showing a content playback process performed by an information processing apparatus.

With reference to flow charts shown in FIGS. 12 to 14, an explanation is given as to a process performed by the information processing apparatus 500 to use a content stored on the information storage medium.

FIG. 12 shows a pre-process performed when the information storage medium described earlier with reference to FIG. 1 is set on the information processing apparatus, before a content playback process is started.

In step S101, the information processing apparatus reads the disk ID revocation list (DIRL) stored on the information storage medium, and checks whether the disk ID revocation list (DIRL) is valid, that is, whether it is in an untamperred state. As described above, when a digital signature using a public key encryption technique is used as a tampering check value for the disk ID revocation list (DIRL), the checking is accomplished using a signature verification key (public key). On the other hand, in the case in which a message authentication code (MAC) is attached as the tampering check value, the MAC verification process described above with reference to FIG. 3 is performed.

If it is determined that the disk ID revocation list (DIRL) has been tampered (that is, if the answer to step S102 is no), the process proceeds to step S106. In step S106, the process is ended without performing the following process, that is, playback process.

If it is determined that the disk ID revocation list (DIRL) is in the untamperred state (that is, if the answer to step S102 is Yes), the process proceeds to step S103. In step S103, the version of the disk ID revocation list (DIRL) read from the information storage medium is compared with the version of the disk ID revocation list (DIRL) stored in the memory of the information processing apparatus. If the version of the disk ID revocation list (DIRL) read from the information storage medium is newer than the version of the disk ID revocation list (DIRL) stored in the memory of the information processing apparatus, then, in step S105, the disk ID revocation list (DIRL) stored in the memory of the information processing apparatus updated by writing the disk ID revocation list (DIRL) read from the information storage medium into the memory of the information processing apparatus. This process allows the disk ID revocation list (DIRL) stored in the memory of the information processing apparatus to be updated whenever a newer version of the disk ID revocation list (DIRL) is found.

In a case in which no disk ID revocation list (DIRL) is stored in the memory of the information processing apparatus, if the tampering check process indicates that the disk ID revocation list (DIRL) read from the information storage medium is valid, the disk ID revocation list (DIRL) is directly stored into the memory of the information processing apparatuses without performing the comparison in terms of the version.

In the example described above, the disk ID revocation list (DIRL) is stored on the disk, and the disk ID revocation list (DIRL) stored in the memory of the playback apparatus is updated using the disk ID revocation list (DIRL) stored on the disk. Alternatively, the information processing apparatus may acquire a newest disk ID revocation list (DIRL) from a central authority or a server entrusted by the central authority via a telephone line or the Internet, and the disk ID revocation list (DIRL) stored in the memory may be updated according to the acquired newest disk ID revocation list (DIRL). When the information processing apparatus is produced, a disk ID revocation list (DIRL), which is newest as of that time, may be stored in the memory of the information processing apparatus. Among information processing apparatuses located in a home and connected to each other via a network, information about the version of the disk ID revocation list (DIRL) stored in the memory of each information processing apparatus is provided to each other, and an old version of disk ID revocation list (DIRL) may be replaced with a newer version of disk ID revocation list (DIRL). If the medium used is of a rewritable type, a newest version of disk ID revocation list (DIRL) is written on the medium by a recording apparatus, and a disk ID revocation list (DIRL) of an apparatus may be updated according to the newest disk ID revocation list (DIRL) written on the medium of the rewritable type when the medium is handled.

Now, referring to FIG. 13, a revocation checking process performed by the information processing apparatus is described below. This process is performed following the process shown in FIG. 12. In step S201, the information processing apparatus reads information storage medium ID from the information storage medium.

In step S202, a check is made as to whether the information storage medium ID read from the information storage medium is included in the revoked ID list of the disk ID revocation list (DIRL) stored in the memory of the information processing apparatus.

In step S203, if the information storage medium ID read from the information storage medium is found in the revoked ID list of the disk ID revocation list (DIRL), the process proceeds to step S204. In step S204, the process is ended without performing the following process, that is, without performing the content playback process.

When the information storage medium ID read from the information storage medium is included in the revoked ID list, the information storage medium ID read from the information storage medium is one of information storage medium IDs that have been detected by the central authority (CA) from illegally copied information storage media such as CD-R and that have been described in the revoked ID list. In this case, the information storage medium set on the information processing apparatus is one of unauthorized information storage media such as illegally copied CD-R or the like, and thus the information processing apparatus ends the process without allowing the content to be played back from this information storage medium.

In the case in which it is determined in step S203 that the information storage medium ID read from the information storage medium is not included in the revoked ID list of the disk ID revocation list (DIRL), the content playback process is started.

Referring to FIG. 14, the content playback process is described below. In step S301, the information processing apparatus reads encryption key information, i.e., an enabling key block (EKB) from the information storage medium. In step S302, the information processing apparatus acquires a content key by decoding the enabling key block (EKB), based on a device node key (DNK) that has already been supplied, in the form of a hierarchical key structure, to the information processing apparatus, in a similar manner to that described above with reference to FIG. 6.

In step S303, an encrypted content to be played back is read from the information storage medium. In step S304, the encrypted content is decoded using the content key acquired in step S302, and the decrypted content is played back. In step S305, it is determined whether the end of the content being played back has been reached. If not, steps S303 and S304 are repeated. If the end of the content being played back has been reached, the process is ended.

When the content key is extracted, the extraction may be performed using not only the EKB but also other information stored on the disk, such as content copy control information.

When a disk manufacturer produces a disk, the content key encrypted using a root key may be stored on the disk, and the information processing apparatus may acquire the content key by decrypting this encrypted content key.

On the same information storage medium, the content may be encrypted using different content keys depending on addresses at which the content is stored. In this case, the information processing apparatus repeatedly performs steps S301 to S304 as many times as needed to read the content and decode it.

[4. Production, Supply, and Management of Information Storage Medium]

Figure 15:
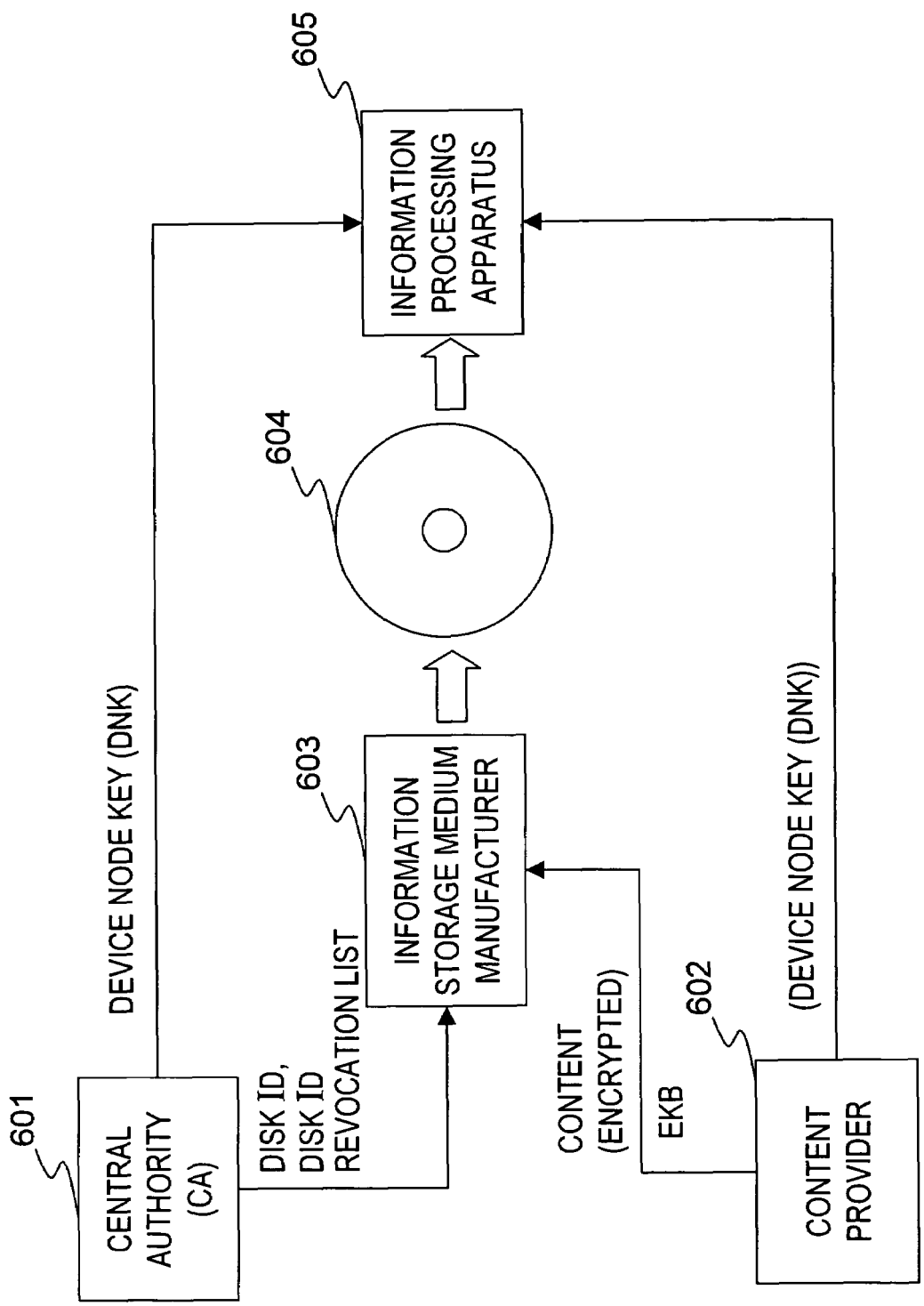
FIG. 15 is a diagram showing a manner in which information processing media are produced and a manner in which the production of information processing media is controlled.

Referring to FIG. 15, production, supply, and management of an information storage medium on which a content is stored are described below.

In an example shown in FIG. 15, an information storage medium manufacturer 603 produces an information storage medium 604, such as a CD, and the produced information storage medium is used on an information processing apparatus 605 of a user.

As described earlier with reference to FIG. 1, an encrypted content, encryption key information, an information storage medium (disk) ID, and information storage medium (disk) ID revocation list (DIRL) are stored on an information storage medium.

A content provider 602 encrypts the content and provides the resultant encrypted content to the information storage medium manufacturer 603. The content provider 602 also provides, to the information storage medium manufacturer 603, an enabling key block (EKB) that can be processed only by a device node key (DNK) possessed by a device (information processing apparatus) of a particular user. A central authority (CA) 601 provides the information storage medium (disk) ID and the information storage medium (disk) ID revocation list (DIRL) to the information storage medium manufacturer 603.

The information storage medium manufacturer 603 produces the information storage medium (disk) 604 on which the encrypted content and the enabling key block (EKB) received from the content provider 602 and the information storage medium (disk) ID and the information storage medium (disk) ID revocation list (DIRL) received from the central authority (CA) 601 are stored, and the information storage medium manufacturer 603 provides the produced storage medium (disk) 604 to a user. If the user sets the information storage medium (disk) 604 on the information processing apparatus 605, the content usage process described above is performed.

The providing of the device node key (DNK) to the user information processing apparatus may be performed by either the central authority 601 or the content provider 602, or otherwise by another service provider, which is not shown in the figure.

Figure 16:
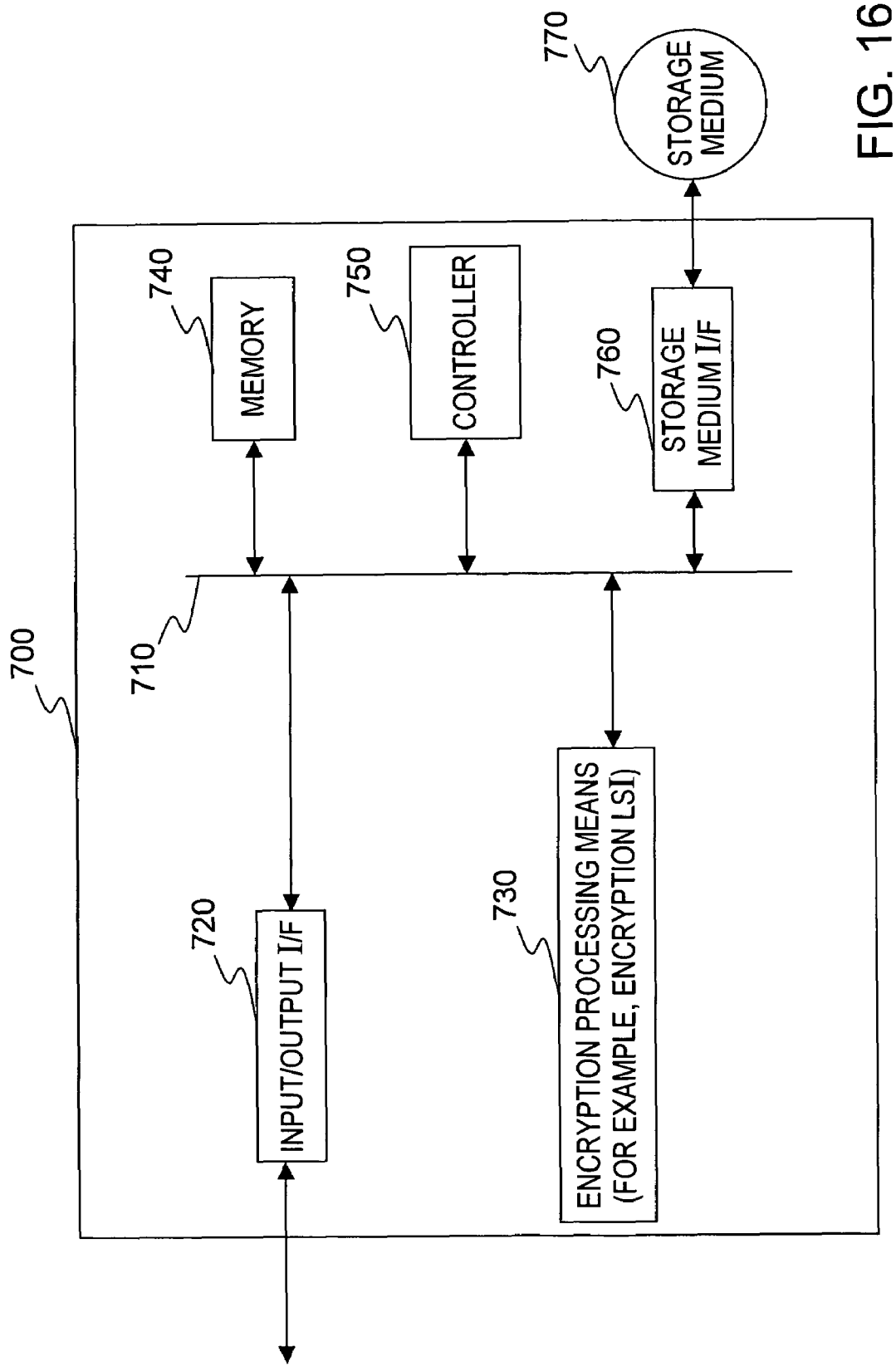
FIG. 16 is a diagram showing an example of a structure of an apparatus for producing an information storage medium.

With reference to FIG. 16, an example of the construction of an information storage medium production apparatus is described below. The information storage medium production apparatus 700 includes an input/output I/F (Interface) 720, encryption processing means 750, a ROM (Read Only Memory) 760, a CPU (Central Processing Unit) 770, a memory 780, and a storage medium interface (I/F) 790 for interfacing with a storage medium 795. These parts are connected to each other via a bus 710.

The input/output I/F 720 receives a digital signal supplied from the outside and outputs the received digital signal over the bus 710. More specifically, for example, the input/output I/F 720 receives an encrypted content and an enabling key block (EKB) from a content provider, and an information storage medium (disk) ID and an information storage medium (disk) ID revocation list (DIRL) from a central authority (CA) via a network. Note that as many information storage medium (disk) IDs as the number of disks to be produced are received from the central authority (CA).

The encryption processing means 730 is implemented, for example, in the form of a one-chip LSI (Large Scale Integrated Circuit) and serves to encrypt or decrypt a digital signal such as digital content data supplied via the bus 710 and outputs the resultant signal over the bus 710. In a case in which the content provided by the content provider is in an unencrypted form, the encryption processing means 730 encrypts the content. The encryption processing means 750 does not necessarily need to be implemented on a one-chip LSI but may be implemented using software or a combination of software and hardware.

The memory 740 stores the encrypted content and the enabling key block (EKB) received from the content provider, and the information storage medium (disk) ID and the information storage medium (disk) ID revocation list (DIRL) received from the central authority (CA). Note that as many information storage medium (disk) IDs as the number of disks to be produced are received from the central authority (CA) and stored in the memory 740.

The controller 750 performs control the process of producing the information storage medium in accordance with a production program. The controller 750 includes a control unit such as a CPU and a memory in which the program is stored. Under the control of the controller 750, data stored in the memory 740 is stored onto the storage medium.

The storage medium 770 is a medium capable of storing digital data. Specific examples of the storage medium 770 include an optical disk such as a DVD, a CD or an MD, a magentooptical disk, a magnetic disk, a magnetic tape, and a semiconductor memory such as a RAM. Data to be stored is received via the storage medium interface 760 and stored on the storage medium 770.

Figure 17:
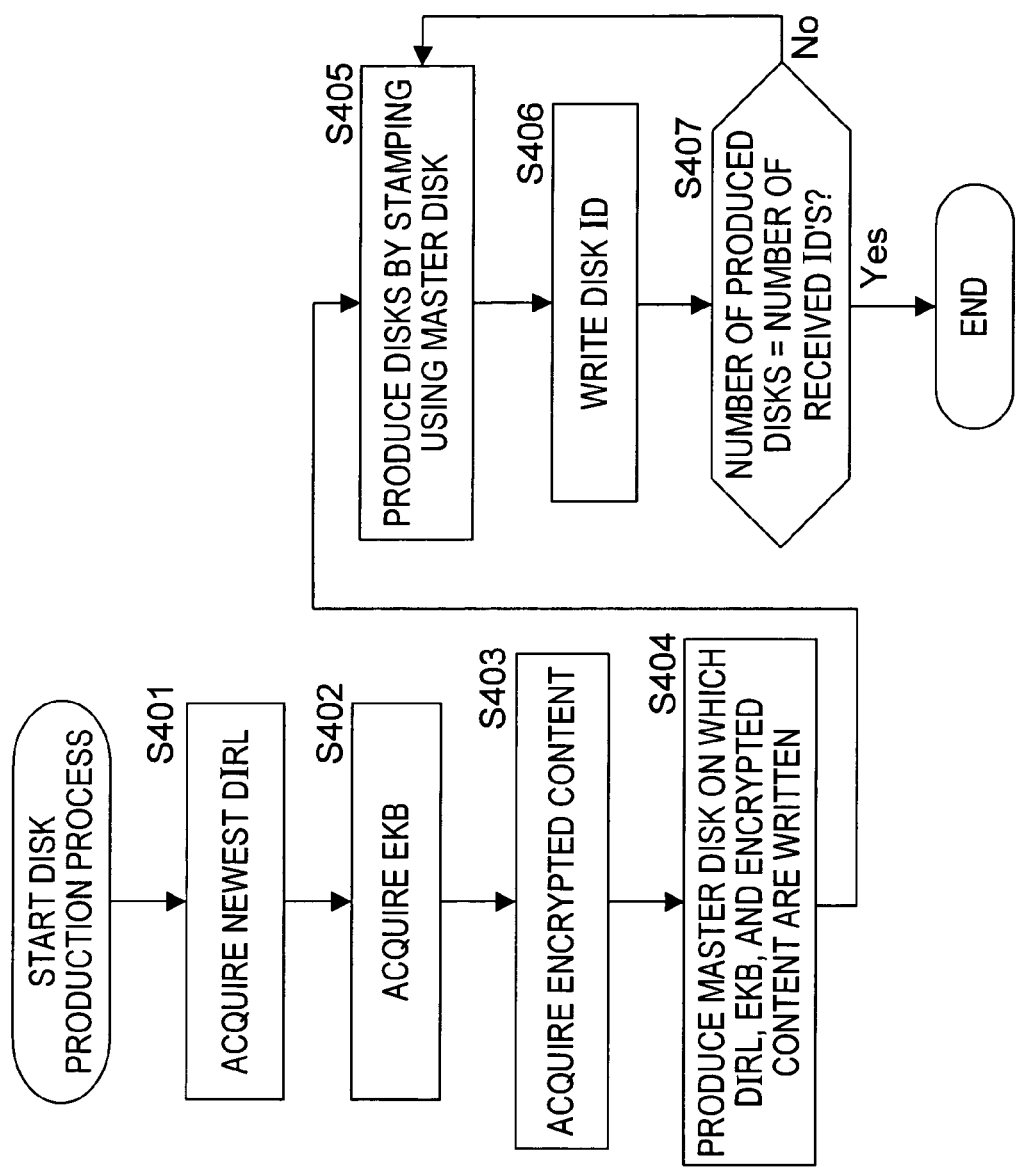
FIG. 17 is a flow chart showing a process of producing an information storage medium.

Referring to FIG. 17, the disk production process is described below. This process shown in FIG. 17 is performed by the information storage medium production apparatus of the information storage medium manufacturer. As described above, the information storage medium has the memory, in which the encrypted content and the enabling key block (EKB) received from the content provider, and the information storage medium (disk) ID and the information storage medium (disk) ID revocation list (DIRL) received from the central authority (CA) are stored. Note that as many information storage medium (disk) IDs as the number of disks to be produced are received from the central authority (CA).

In step S401, the information storage medium (disk) ID revocation list (DIRL), received from the central authority (CA) and stored in the memory, is read from the memory. In steps S402 and S403, the enabling key block (EKB) and the encrypted content received from the content provider are read from the memory. In step S404, a master disk is produced by writing these data on an information storage medium (disk).

In the next step S405, copies of the master disk are produced by a stamping process using the master disk. Then in step S406, the disk IDs received from the central authority (CA) and stored in the memory are sequentially read from the memory and written on the respective disks. In step S407, if the number of produced disks reaches the number of disk IDs received from the central authority (CA), the production of disks is ended.

As described above, the disk manufacturer stores different IDs on the respective produced disks according to the number of disk IDs received from the central authority (CA).

Thus, the information storage media (disks) distributed in markets have different IDs. Therefore, if a plurality of disks having the same disk IDs are found, they are regarded as unauthorized copies of disks, and the central authority (CA) updates the information storage medium (disk) ID revocation list (DIRL) such that the detected unauthorized disk IDs are added to the list, and the central authority (CA) supplies the updated list to the disk manufacturers so that the updated list is stored on disks produced thereafter.

If a user, who purchased a disk having the updated list, sets the disk on the information processing apparatus to play back a content, then, as described earlier, the version of the list is compared with the version of the information storage medium (disk) ID revocation list (DIRL) stored in the memory of the information processing apparatus, and the updated list is stored in the memory. Thus, the list stored in the memory of the information processing apparatus of the user is updated when a newer version of the list is found.

The present invention has been described in detail above with reference to particular embodiments. It should be apparent to those skilled in the art that various modifications and substitutions are possible without departing from the spirit and the scope of the invention. That is, the embodiments have been described above by way of example but not of limitation. The scope of the invention is to be determined solely by the claims.

Any of the processes disclosed in the present description may be performed by means of hardware, software, or a combination of hardware and software. In the case in which a process is performed by means of software, a program of the process may be installed into a memory disposed in a dedicated computer embedded in hardware and the program may be executed by the computer, or the program may be installed on a general-purpose computer capable of executing various processes and may be executed on the general-purpose computer.

The program may be stored in advance in a storage medium such as a hard disk or a ROM (Read Only Memory). Alternatively, the program may be stored (recorded) temporarily or permanently on a removable storage medium such as a floppy disk, a CD-ROM (Compact Disc Read Only Memory), an MO (Magnetooptical) disk, a DVD (Digital Versatile Disc), a magnetic disk, or a semiconductor memory. Such a removable storage medium may be provided in the form of so-called package software.

Instead of installing the program from the removable storage medium onto the computer, the program may also be transferred to the computer from a download site via radio transmission or via a network such as an LAN (Local Area Network) or the Internet by means of wire communication. In this case, the computer receives the program transmitted in the above-described manner and installs the program on a storage medium such as a hard disk disposed in the computer.

The processes disclosed in the present description may be performed time-sequentially in the same order as that described in the program, or may be performed in parallel or individually depending on the processing power of the computer.

INDUSTRIAL APPLICABILITY

According to the present invention, as described above, an encrypted content, encryption key information needed to decode the encrypted content, an information storage medium ID which is an identifier uniquely assigned to an information storage medium, and an information storage medium ID revocation list, which is a list of information storage medium IDs determined as fraudulent, are stored on the information storage medium. In an information processing apparatus configured to read and play back the content stored on the information storage medium, the playback of the content is allowed only when the information storage medium ID stored on the information storage medium is not identical to any of revoked information storage medium IDs described in the information storage medium ID revocation list. By describing information storage medium IDs stored on storage media detected as including unauthorized copies of contents in the information storage medium ID revocation list, it is possible to prevent a disk having an ID identical to any one of IDs described in the list from being played back, and thus it is possible to prevent an unauthorized copy of a content from being distributed and used.

Furthermore, in the information processing apparatus according to the present invention, a tampering check process is performed to check whether no tampering is made on the information storage medium ID revocation list stored on the information storage medium. Only when the check indicates that no tampering is made, the version of the information storage medium ID revocation list stored on the information storage medium is compared with the version of that stored in the memory, and, if the version of the information storage medium ID revocation list is newer than the version of that stored in the memory, the information storage medium ID revocation list is updated by storing the information storage medium ID revocation list stored on the information storage medium into the memory. This makes it possible to control the content playback operation in accordance with the list that is updated when a newer version is found.

The invention claimed is:

1. An information storage medium (ISM) comprising means storing:
   an encrypted content;
   encryption key information needed in a process of decoding the encrypted content;
   an associated ISM ID, said associated ISM ID being an identifier uniquely assigned to the ISM; and
   a first list identifying revoked ISM ID's, said first list having an associated first version date and an associated tampering check value for checking whether said first list is untampered,
   wherein,
   the ISM is adapted for operation with an information processing apparatus, said apparatus having
      means for executing a process for playing back content stored on the ISM,
      a memory for storing a second list identifying revoked ISM ID's, said second list having an associated second version date,
      means for checking whether the associated ISM ID is identical to a revoked ISM ID identified in said second list,
      means for disabling the process for playing back content when the associated ISM ID is identical to a revoked ISM ID identified in said second list,
      means for checking the associated tampering check value to determine whether the first list identifying revoked ISM ID's is untampered, and
      means for updating said memory, by replacing said second list with the first list, said means for updating said memory enabled to only operate when the first list is untampered and the associated first version date is later than said associated second version date.

2. The information storage medium according to claim 1, wherein the encryption key information includes an enabling key block (EKB) as encryption key data from which a key used to decrypt the encrypted content is extractable.

3. The information storage medium according to claim 2, wherein the enabling key block (EKB) is encryption key information that can be decrypted based on a device node key (DNK) provided in the form of a hierarchical key-distribution tree structure to an information processing apparatus that is a device using the information storage medium.

4. An information processing apparatus comprising:
means for executing a process for playing back content stored on an information storage medium (ISM), wherein both an associated ISM ID and a first list identifying revoked ISM ID's are stored on said ISM, said first list having an associated first version date;
a memory for storing a second list identifying revoked ISM ID's, said second list having an associated second version date;
means for checking whether the associated ISM ID is identical to a revoked ISM ID identified in the second list;
means for disabling the process for playing back content when the associated ISM ID is identical to a revoked ISM ID identified in the second list;
means for performing a tampering check process to check whether the first list identifying revoked ISM ID's is untampered; and
means for updating the memory, by replacing the second list with the first list, said means enabled to only operate when both: the tampering check process determines that the first list is untampered; and, the associated first version date is later than the associated second version date.

5. The information processing apparatus according to claim 4, wherein:
the information processing apparatus has a device node key (DNK) as key information provided in the form of a hierarchical key-distribution tree structure; and a key used to decrypt an encrypted content stored on the information storage medium is extracted by decoding, based on the device node key (DNK), an enabling key block (EKB) stored as encryption key information on the information storage medium.

6. An information storage medium (ISM) production system comprising:
means for producing a plurality of ISM's and storing information on at least one ISM, said information comprising:
an encrypted content, encryption key information needed in a process of decoding the encrypted content, a first list identifying revoked ISM ID's, said first list having an associated first version date and an associated tampering check value for checking whether the first list is untampered, and an associated ISM ID, said associated ISM ID being an identifier uniquely assigned to each ISM;
wherein, the at least one ISM is adapted for operation with an information processing apparatus, said apparatus having:
means for executing a process for playing back content stored on the ISM;
a memory for storing a second list identifying revoked ISM ID's, said second list having an associated second version date;
means for checking whether the associated ISM ID is identical to a revoked ISM ID identified in the second list;
means for disabling the process for playing back content when the associated ISM ID is identical to a revoked ISM ID identified in the second list;
means for checking the associated tampering check value to determine whether the first list identifying revoked ISM ID's is untampered; and
means for updating the memory, by replacing the first list with the first list, said means for updating the memory enabled to only operate when the first list is untampered and the associated first version date is later than the associated second version date.

7. The information storage medium production apparatus according to claim 6, wherein the encryption key information includes an enabling key block (EKB) as encryption key data to be applied in the decryption of the encrypted content.

8. An information processing method comprising the steps of:
executing, with an information processing apparatus, a process for playing back content stored on an information storage medium (ISM), wherein both an associated ISM ID and a first list identifying revoked ISM ID's are stored on said ISM, said first list having an associated first version date, said executing step further comprising:
reading the associated ISM ID;
checking whether the associated ISM ID is identical to a revoked ISM ID identified in a second list identifying revoked ISM ID's, said second list having an associated second version date, and said second list being stored in a memory of the information processing apparatus;
disabling the process for playing back content when the associated ISM ID is identical to a revoked ISM ID identified in the second list;
performing a tampering check process to check whether the first list identifying revoked ISM ID's is untampered; and
updating the memory of the information processing apparatus, by replacing the second list with the first list, only when both: the tampering check process determines that the first list is untampered; and, the associated first version date is later than the associated second version date.

9. The information processing method according to claim 8, further comprising the step of acquiring a key used to decode an encrypted content stored on the information storage medium by decoding an enabling key block (EKB) stored as encryption key information on the information storage medium, the decoding of the enabling key block (EKB) being based on a device node key (DNK) provided as key information provided in the form of a hierarchical key-distribution tree structure.

10. An information storage medium (ISM) production method, comprising:
producing a plurality of ISM's and storing information on at least one ISM, said information comprising:
an encrypted content, encryption key information needed in a process of decoding the encrypted content, a first list identifying revoked ISM ID's said first list having an associated first version
date and an associated tampering check value for checking whether the first list is untampered, and an associated ISM ID, said associated ISM ID being an identifier uniquely assigned to each ISM;
wherein, the at least one ISM is adapted for operation with an information processing apparatus, said apparatus having:
means for executing a process for playing back content stored on the ISM;

a memory for storing a second list identifying revoked ISM ID's, said second list having an associated second version date;

means for checking whether the associated ISM ID is identical to a revoked ISM ID identified in the second list;

means for disabling the process for playing back content when the associated ISM ID is identical to a revoked ISM ID identified in the second list;

means for checking the associated tampering check value to determine whether the first list identifying revoked ISM ID's is untampered; and means for updating the memory, by replacing the second list with the first list, said means for updating the memory enabled to only operate when the first list is untampered and the associated first version date is later than the associated second version date.

11. A computer storage medium encoded with a computer program for executing a process for playing back content stored on an information storage medium (ISM), wherein both an associated ISM ID and a first list identifying revoked ISM ID's are stored on said ISM, said first list having an associated first version date, said process comprising the steps of:

reading the associated ISM ID; checking whether the associated ISM ID is identical to a ISM ID identified in a second list identifying revoked ISM ID's, said second list having an associated second version date, and said second list being stored in a memory of the information processing apparatus;

disabling the process for playing back content when the associated ISM ID is identical to a revoked ISM ID identified in the second list;

performing a tampering check process to check whether the first list identifying revoked ISM ID's is untampered; and updating the memory of the information processing apparatus, by replacing the second list with the first list, only when both: the tampering check process determines that the first list is untampered; and, the associated first version date is later than the associated second version date.

* * * * *